(12) United States Patent
Bor-Yaliniz et al.

(10) Patent No.: US 11,026,106 B2
(45) Date of Patent: Jun. 1, 2021

(54) METHOD AND SYSTEM OF PERFORMANCE ASSURANCE WITH CONFLICT MANAGEMENT IN PROVISIONING A NETWORK SLICE SERVICE

(71) Applicants: Remziye Irem Bor-Yaliniz, Ottawa (CA); Nimal Gamini Senarath, Ottawa (CA); Mohammad Moshiur Rahman, Ottawa (CA); Chengchao Liang, Ottawa (CA)

(72) Inventors: Remziye Irem Bor-Yaliniz, Ottawa (CA); Nimal Gamini Senarath, Ottawa (CA); Mohammad Moshiur Rahman, Ottawa (CA); Chengchao Liang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/670,962

(22) Filed: Oct. 31, 2019

(65) Prior Publication Data

US 2020/0154292 A1 May 14, 2020

Related U.S. Application Data

(60) Provisional application No. 62/758,354, filed on Nov. 9, 2018.

(51) Int. Cl.
*H04W 24/04* (2009.01)
*H04L 12/24* (2006.01)
*H04W 24/02* (2009.01)

(52) U.S. Cl.
CPC ......... *H04W 24/04* (2013.01); *H04L 41/0893* (2013.01); *H04L 41/5025* (2013.01); *H04W 24/02* (2013.01)

(58) Field of Classification Search
CPC ............. H04L 41/0893; H04L 41/5025; H04L 41/0816; H04L 12/1403; H04L 43/08;
(Continued)

(56) References Cited

U.S. PATENT DOCUMENTS

2018/0139107 A1* 5/2018 Senarath ............... H04L 45/302
2018/0139129 A1* 5/2018 Dowlatkhah ........... H04L 63/08
(Continued)

FOREIGN PATENT DOCUMENTS

CN 108566289 A 9/2018
WO 2017080517 A1 5/2017
(Continued)

OTHER PUBLICATIONS

"3rd Generation Partnership Project; Technical Specification Group Services and System Aspects; Telecommunication management; Management and orchestration of 5G networks; 5G End to end Key Performance Indicators (KPI)"; 3GPP TS 28554 V1.2.2 (Aug. 2018).

*Primary Examiner* — Le H Luu

(57) ABSTRACT

Method and system for performance assurance in a network slice subset instance (NSSI) or a network slice instance (NSI) of a network. The method comprises receiving, at a network management function (OAM) of the network, a trigger indicating a network performance deficiency; based on the trigger, determining, by a data analytics (DAM) function of the OAM (OAM DAM) in coordination with a network analytics function of one of the core network and a radio access network (RAN), an NSI/NSSI modification; and implementing, by the OAM, a change in at least one of: NSI/NSSI policies, configurations in at least one of core network functions, the RAN and network resources, in accordance with the NSI/NSSI modification.

20 Claims, 25 Drawing Sheets

(58) Field of Classification Search
CPC ...... H04L 45/302; H04L 63/08; H04W 24/04; H04W 28/021; H04W 28/0247; H04W 28/0284; H04W 28/08; H04W 48/06; H04W 72/0453; H04W 24/02; G06Q 30/04; H04B 7/0617
See application file for complete search history.

(56) References Cited

U.S. PATENT DOCUMENTS

| | | | |
|---|---|---|---|
| 2018/0241635 A1* | 8/2018 | Rao | H04L 41/0816 |
| 2018/0316799 A1* | 11/2018 | Shaw | H04L 12/1403 |
| 2018/0359337 A1* | 12/2018 | Kodaypak | H04L 43/08 |
| 2019/0052549 A1* | 2/2019 | Duggal | G06Q 30/04 |
| 2019/0053193 A1* | 2/2019 | Park | H04B 7/0617 |
| 2019/0260690 A1 | 8/2019 | Sun et al. | |
| 2019/0281494 A1* | 9/2019 | Chan | H04W 48/06 |
| 2020/0100137 A1* | 3/2020 | Panchal | H04W 72/0453 |

FOREIGN PATENT DOCUMENTS

| | | |
|---|---|---|
| WO | 2018082502 A1 | 5/2018 |
| WO | 2018196793 A1 | 11/2018 |

\* cited by examiner

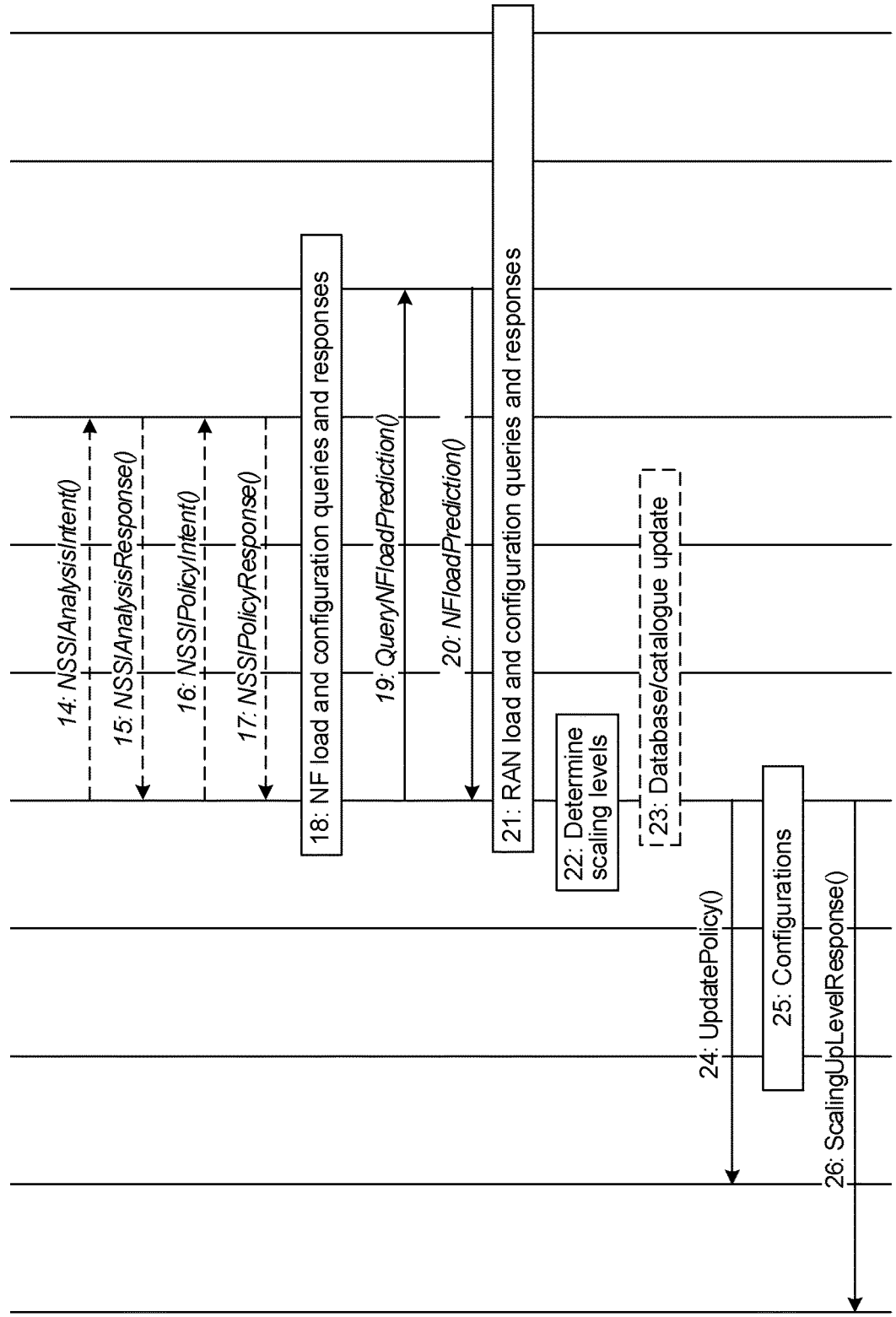

METHOD AND SYSTEM OF PERFORMANCE ASSURANCE WITH CONFLICT MANAGEMENT IN PROVISIONING A NETWORK SLICE SERVICE

CROSS-REFERENCE TO RELATED APPLICATIONS

This application claims the benefit of priority to U.S. Provisional Application Ser. No. 62/758,354 filed Nov. 9, 2018, the contents of which are hereby incorporated by reference.

FIELD OF THE INVENTION

The present invention pertains to the field of data communications in a wireless network and in particular to a method and apparatus for performance assurance and conflict management in provisioning a network slice service.

BACKGROUND

Communication networks enabled by technologies such as network slicing may be flexibly organized so as to serve various customer/business demands. Network slicing is a specific form of virtualization that allows multiple logical networks to run on top of a shared physical network infrastructure. A key benefit of virtualization is that it provides an end-to-end virtual network encompassing not just networking but compute and storage functions also. The objective is to allow a physical mobile network operator to partition its network resources to allow for very different users, or customers, to multiplex over a single physical infrastructure. The resources allocated to a virtualized component could be scaled in/out or up/down by a customer request as indicated in the ETSI NFV standard. Such resources include computing resources, storage or memory resources and link resources which provides transport capability of the links. In this document scaling in and scaling down terms are used synonymously to mean resource decrease although the way resource is decreased inside the infra-structure may be different in these two cases. Similarly scaling up and scaling out terms are used synonymously to represent the action to increase the resources. Network slicing provides a further sharing of a virtualized network or virtualized infra-structure by sharing even virtualized network components across different slices so that a network operator could provide different network services or slices to multiple customers using the same virtualized network. Main differentiation is that multiple network slices may share the same virtualized component. In this case, sharing principle and assigning the shared and non-shared components are decided by the wireless network which is not visible to even the virtualized infra-structure/network provider. The virtualized infra-structure provider may do resource scaling automatically depending on the resource usage or as per the instructions from the infra-structure customer, for example, the network slice provider.

As described later in detail, in 5G networks, a consumer can request a network slice instance (NSI) or a network slice subnet instance (NSSI) from a provider, Usually an NSI is a slice of the network which can provide end to end (E2E) services while NSSI is a segment of a sliced network which can be one or more of a TN part, RAN part or a CN part. In this document network slice is used to generally represent to either an NSI or NSSI unless specifically expressed otherwise.

There are two generic ways a network slice management service consumer (NSMS-C) requests a service. First it can request a network slice instance (NSI) specifying the services it requires together with the performance requirements guarantees it needs for different geographical areas and time periods without specifying the resources it needs. This is termed 'service provisioning scenario with minimum performance guarantee' or 'network slice as NOP internal' in this document. In this scenario the customer is not aware of the internal network structure of the slice. In the other scenario the NSMS-C specifies resource requirements with or without service requirements and the NSI is exposed to the customer. The provider of network slice management service is termed as NSMS-P. Similarly a consumer can request an NSSI in both ways, e.g. NSSI as a service (NSSaaS) or NSSI according to the service provisioning scenario with minimum performance guarantee. The NSSI service provider is termed 'NSSMS-P' and NSSI consumer is termed 'NSSMS-C' in this document.

In building advanced networks, such as those to support future developments in wireless networks (including next generation wireless, such as so-called fifth generation (5G) networks), network slicing provides the ability to create isolated network slices over which different traffic flows can travel. Network slicing provides flexibility and adaptability in the characteristics of each slice, allowing the slices to each have characteristics tailored to the specific needs of different services, optionally provisioned for service according to different service levels. This allows a plurality of different services to be supported by a single pool of network infrastructure, a desired feature for 5G networks. However, managing varying and often conflicting demands for network resources according to different service levels in a potentially large network scale is a complex proposition requiring an effective architecture and management thereof. The problem of managing the different demands become exacerbated when there are conflicting demands for a number of different types of services.

SUMMARY

An object of embodiments of the present invention is to provide a method and apparatus for performance assurance and conflict management in provisioning a network slice service.

Embodiments herein provide, in one aspect, a method for performance assurance in a network slice subset instance (NSSI) or a network slice instance (NSI) of a network. Both NSI and NSSI can be considered as a collection of network functions and associated resources providing communication services. The NSI comprised of a single NSSI and an NSSI could be created using multiple NSSIs. An NSSI might consists of one or more of RAN resources, TN resources or CN resources. The method includes receiving, at a network management function of the OAM of the network, a trigger indicating a network performance deficiency. The method further includes based on the trigger, determining, by a data analytics (DAM) function of the OAM (OAM DAM) in coordination with a network analytics function of one of the core network and a radio access network (RAN), an NSI/NSSI modification. The method further includes implementing, by the OAM, a change in at least one of: NSI/NSSI policies, configurations in at least one of core network functions, the RAN and network resources, in accordance with the NSI/NSSI modification.

In one embodiment, the method further comprises, to the receiving the trigger, receiving a request for a network slice (NSI/NSSI) service and configuring one or more of the core network functions and RAN management functions in at least one of: the NSI/NSSI policies, the configurations in core network functions, and the network resources, in accordance with the network slice service request.

In another embodiment, the implementing by the OAM in coordination with the NWDAF further comprises requesting, by the OAM, one of scaling up and scaling down of NSSI resources based on a resource load level of the NSSI.

In yet another embodiment, the implementing by the OAM in coordination with the NWDAF further comprises sending, by the OAM, a service capacity of the network, a wherein the service capacity is specified in accordance with an amount of traffic of each service of multiple combinations of the supported services as provided by the network.

In another aspect, the trigger indicating the network performance deficiency is responsive to at least one of a detected network performance deficiency an anticipated network performance deficiency, and a violation of a service level agreement (SLA) administered by a NSSI management function (NSSMF) on behalf of the NSSI.

In yet another aspect, the trigger indicating the network performance deficiency that is one of: a data transmission performance deficiency compared to the service level agreement (SLA) requirements, a network resource inadequacy, a low resource utilization and a low slice traffic demand as monitored over a period of time or as predicted for a future time.

In some embodiments, the network resource inadequacy and low resource utilization are based on the network resource utilization of the service reaching a specified threshold level.

In yet another embodiment, the method further comprises, responsive to the change in the at least one of: NSI/NSSI policies, configurations in core network functions, and network resources, sending one of a service level agreement (SLA) or key performance indicators (KPIs) thereof, and a modification to a pre-existing SLA or KPIs thereof to a NSSI management function.

In one aspect, the change in the at least one of: NSI/NSSI policies, configurations in core network functions, and network resources is enabled by at least one of a traffic control change, a session admission control change, a redirection of ingress network traffic of the NSSI to at least another NSSI of the network, and relaxation of a quality of service (QoS) of traffic using the NSSI.

In yet another embodiment, the configuring one or more of the core network functions and RAN management functions in at least one of: NSI/NSSI policies, configurations in core network functions, and network resources, in accordance with the network slice service request is enabled by at least one of a traffic control policy, a session admission control policy, and a quality of service (QoS) of traffic using the NSSI.

In one aspect, the traffic control policy includes at least one of network resource load balancing, source traffic blocking, source traffic smoothing, traffic filtering for a set of ingress traffic, and modifying a service prioritization in at least one network region or network function.

In another aspect, the source traffic blocking policies include blocking ingress traffic when it exceeds the service capacity parameter provided in the policy for a geographical area wherein the service capacity is one or more of: a number of QoS flows of different QoS flows; a number of sessions from each application; a number of users using certain application at a given time; an arrival distribution characteristic of sessions from each application type and their active duration distributions; and a number of users being served with probabilities of them being active and the probabilities of them using a given application. During a given time period.

In one aspect, the traffic control change includes at least one of network resource load balancing, source traffic blocking, source traffic smoothing, traffic filtering for a set of ingress traffic, and modifying a service prioritization in at least one network region or network function.

In another embodiment, the network comprises a plurality of NSIs, and further comprising sharing the NSSI among the plurality of NSI's, each of the plurality having a respective service level agreement (SLA) in accordance with the sharing.

In another broad aspect, a system supporting a network slice subset instance (NSSI) or a network slice instance (NSI) in a communication network is provided. The system comprises a communication interface; a processor; and a memory device storing instructions that, when executed by one or more processors, cause the system to: receive a trigger indicating a network performance deficiency; based on the trigger, determine an NSI/NSSI modification; and implement a change in at least one of: NSI/NSSI policies, configurations in at least one of the core network functions, the RAN, and network resources, in accordance with the NSI/NSSI modification.

In one aspect, the instructions, when executed by one or more processors, further cause the system to: prior to receiving the trigger, receive a request for a network slice (NSI/NSSI) service and configure one or more of the core network functions and RAN management functions in at least one of: the NSI/NSSI policies, the configurations in core network functions, and the network resources, in accordance with the network slice service request.

In another aspect, the instructions when executed by one or more processors, further cause the system to: requesting one of scaling up and scaling down of NSSI resources based on a resource load level of the NSSI that alleviates the network performance deficiency.

In an embodiment, the trigger indicating the network performance deficiency is responsive to at least one of a detected network performance deficiency, an anticipated network performance deficiency, and a violation of a service level agreement (SLA) administered by a NSSI management function (NSSMF) on behalf of the NSSI.

In other aspects, the instructions, when executed by one or more processors, further cause the system to: responsive to the change in the at least one of: NSI/NSSI policies, configurations in core network functions, and network resources, send one of a service level agreement (SLA) or key performance indicators (KPIs) thereof, and a modification to a pre-existing SLA or KPIs thereof to a NSSI management function.

In yet another aspect, the instructions, when executed by one or more processors, further cause the system to: coordinate with a network analytics function of one of the core network and a radio access network (RAN) to determine the NSI/NSSI modification.

In various embodiments provided herein include a method for integrating a first network segment with a second network segment to create a third network segment using an abstraction of the first network segment. The method, in one example embodiment, comprises identifying the atomic services provided by the first network segment and the combination of traffic load of different services that can be handled, either a maximum or any variation of thereof, by the first network segment from each atomic service.

In some embodiments, the atomic services comprise:
- a specific traffic flow with a certain QoS, certain traffic characteristics and certain NF chain;
- a specific traffic flow with a certain QoS, certain traffic characteristics, and a certain NF chain which is transmitted from one or more specified ingress points to one or more specified egress point(s);
- flows with certain QoS with specific traffic characteristic which is transmitted from one or more specified ingress points to one or more specified egress point(s);
- Traffic belonging to a specific application which is transmitted from one or more specified ingress points to one or more specified egress point(s);
- Traffic belonging to a PDU session which is transmitted from one or more specified ingress points to one or more specified egress point(s);
- Traffic belonging to certain common characteristics and requirement.

Other aspects provide a method to evaluate the current loading of a network segment in terms of the services it provides (service loading). The service loading comprises one of: an amount of traffic in the network segment for each atomic service, and an amount of resources used by each service. Another aspect provides a method to evaluate the current loading of a network segment in terms of the resource it utilises (resource loading). The resource loading comprises one of: an amount of resources it utilizes or the amount of resources it utilizes for the bottleneck resource for specific geographical area and/or time period expressed as a statistical evaluation such as maximum, percentage or average utilization.

Yet other embodiments provide a method for preparing a service catalogue for a provider of a network segment or network slice. The service catalogue describes different services the network segment could provide, and the capacity boundaries of one atomic service when other atomic services have different levels of traffic loading.

Another embodiment provides for obtaining the remaining capacity of a network segment or slice in accordance with the current network load and the capacity of the network system.

Yet additional variations provide for a method of developing a set of service requirements to network slice resource requirement. The method comprises: generating different types of input traffic combinations to match different levels of service loads, monitoring the corresponding resource usage and evaluating the matching to determine an average mapping, a worst case mapping or a distribution of variation in the mapping and creating a service requirement based on a network requirement database.

In some variations, the method comprises generating different types of input traffic combinations involve obtaining the run-time measurements of resource usage for different levels of input traffic.

Yet another embodiment provides a method of addressing issues related to traffic performance degradation, where the traffic performance degradation relates to not meeting SLA requirements such as QoS, throughput as well as network performance degradation, including but not limited to low utilization.

BRIEF DESCRIPTION OF THE FIGURES

Further features and advantages of the present invention will be apparent from the following detailed description, taken in combination with the appended drawings, in which:

FIGS. 5A and 5B illustrate, in one embodiment, a procedure for scaling up of network resources with conflict prevention.

Throughout the appended drawings, like features are identified by like reference numerals.

DETAILED DESCRIPTION

Figure 1:
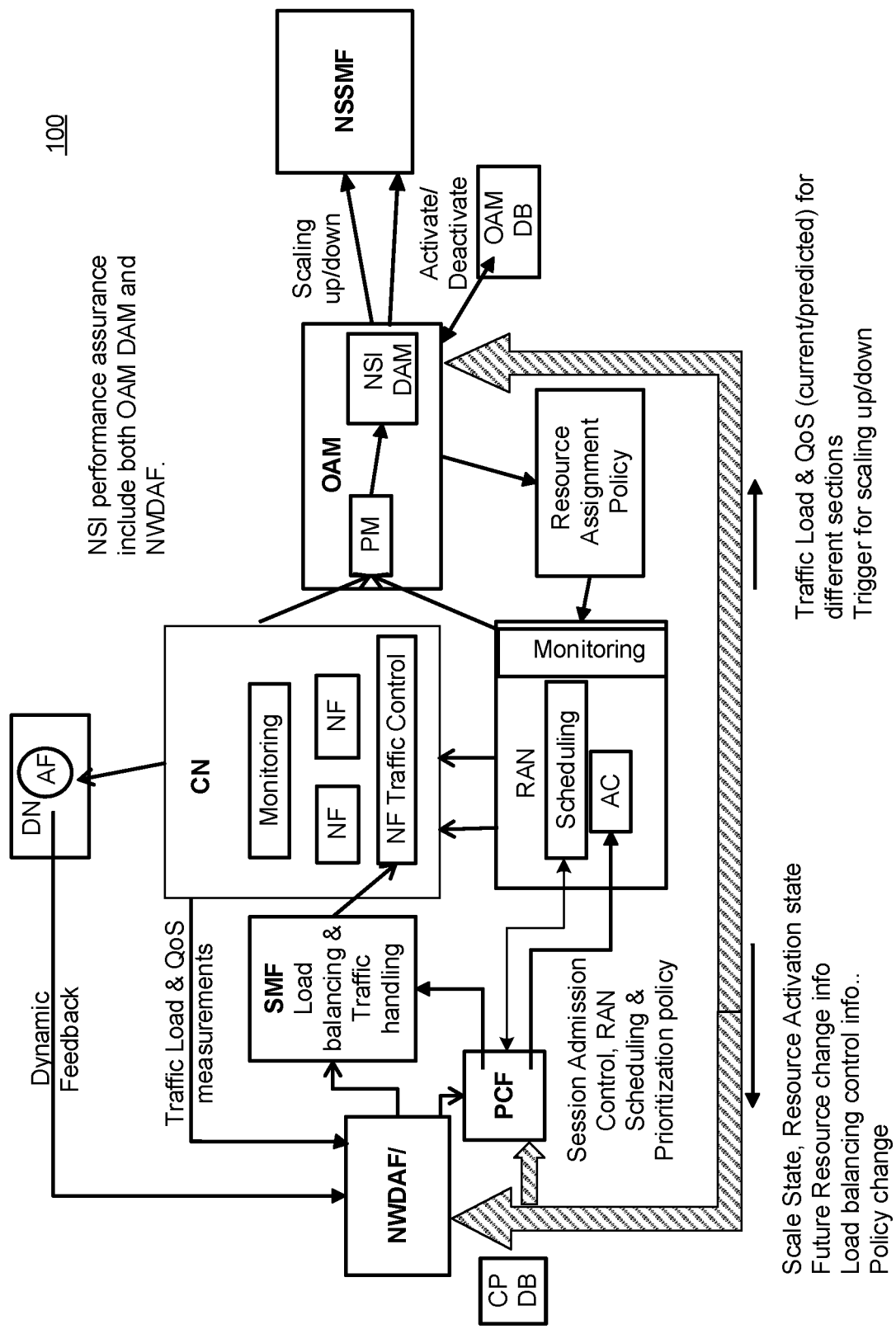
FIG. 1 illustrates, in one embodiment, a scheme for NSSI performance assurance (PA) with conflict management for a non-shared NSSI.

Embodiments of the present invention provide advantages by way of a generic performance assurance framework that enables coordination amongst different network functional segments of the communication network to avoid or minimize conflicting demands for network slice or sub-slice resources. Embodiments presented herein provide detailed procedures for coordination among functional network segments (e.g. NSSIs) such as the core network (CN), transport network (TN), data network outside 3GPP domain (DN) and a network management function (OAM) of the communication network. Such different functional network segments may be typically managed by different administrators or network operators, under varying service level agreement (SLA) arrangements.

In particular, solutions presented in the disclosure herein assure performance in conformance with terms of an NSSI SLA when the NSSI is shared among multiple NSIs, with multiple SLAs being applicable, while avoiding duplication of actions and procedures by the OAM, CN, TN and DN.

Embodiments herein further provide solutions that advantageously avoid conflicting demands CN service assurance actions, radio access network (RAN) service assurance actions, and OAM service assurance actions, such as anticipated congestion and network resources overloading.

Embodiments provided herein relate to the coordination of control plane and management plane functions, in order to inhibit problems when both types of functions are operating to react to conditions such as performance deficiencies. For example, the control plane and management plane functions may coordinate via coordinated protocols (which may include message passing), in order to carry out performance assurance in an orderly manner. For example, the NWDAF may perform analysis that help (PCF or SMF) to create load balancing, ingress traffic control, direction of admission control policies, etc. At the same time, management functions such as OAM functions may direct scaling, dynamic resource control, and other policy controls. By coordinating these activities, the overall performance management can be carried out while avoiding activities by the management functions that would tend to counteract those of the control functions, or vice-versa.

Performance assurance (PA) requires coordinated work from different network segments of the network, e.g. CN, RAN, TN, DN and OAM. If they work independently from each other, strict procedures are required such that individual actions do not conflict with each other. When different segments are managed by different administrations (e.g., network operators) the customer who obtains these network segments from a provider may potentially take a coordinating role in PA. Such control by the customer may occur when a NSSI customer wants to share an NSSI among multiple NSIs the customer creates for its services. A coordinated PA framework with detailed procedures is thus provided herein. For example, embodiments provide for a generic framework for PA considering required coordination among above entities and detailed procedures. This is one embodiment to avoid conflicts mentioned above. Methods and associated apparatus are provided to avoid conflicting situations for Core Network service assurance actions, RAN actions and OAM actions. This may facilitate reacting to future/current congestion/resource overloading by RAN/CN and OAM, actions for resource optimization by OAM may confuse CN/RAN carrying out PA, or a combination thereof. Embodiments provide for a method and associated apparatus for performance assurance by the customer using the network abstractions and current resource usage provided by the provider. Embodiments provide for a method and associated apparatus for assuring an NSSI SLA is adhered to when NSSI is shared among multiple NSIs and has multiple SLAs. OAM and CN control functions may perform duplicate actions.

Embodiments provided herein advantageously enable a customer to specify and implement performance assurance using the network abstractions and current resource usage levels as provided by a network provider or operator. Even where an NSSI customer may desire to share an NSSI among multiple NSIs, existing solutions may be inadequate to provide the customer with such level of control over NSI/NSSI resources. In particular, in one embodiment where the NSSI is obtained from the RAN, a NSSI management function (NSSMF) exposes a NSSI capacity and a current loading level to a NSSI customer of the NSSI, wherein the customer is enabled to determine a capacity boundary for load balancing by transferring traffic to or from other NSSIs of the network, and advantageously determine one or more policy changes for traffic handling.

Embodiments of the invention provide for a method for performance assurance (PA) by a Telecommunications Management system for a customer service provided using a network slice, including: providing to a core network function or to an RAN function associated with the network slice, the information related to the performance assurance of the network slice; receiving an alarm condition related to performance assurance in accordance with the slice information; and modifying the network slice in accordance with the received alarm condition. The network slice may be a network slice instance (NSI) or network slice subnet instance (NSSI). The information may include KPIs related to the SLA associated with the customer service. KPIs may include a performance index for the aggregation of traffic for that slice in at least one segment of the network for one time window and loading situation. In some embodiments, the information related to the performance assurance includes the ingress and egress node locations related to the network slice. Providing slice information may occur during the network slice establishment phase or the network slice modification phase.

The information related to the performance assurance may include resource modification possibility information by the OAM. The information related to resource modification may include information related to resource scaling or resources activation/deactivation. The resource modification possibility information may include one or more of: NF scaling states; a current NF scaling state; migration of current (V)NF to a data center with better network bandwidth, information that no further increase of resources could be done relate to a slice constituent; and information that no further decrease of resources could be done relate to a slice constituent.

Receiving an alarm condition may include receiving information of one or more control plane functions traffic load and the associated QoS performance. Receiving an alarm condition may include receiving information that one or more control plane functions traffic load and the associated QoS performance predicted for future time interval. The information related to the performance assurance may include the load balancing strategy information. Providing slice information may include providing this information to the Core Network to specify the requirements related to RAN performance specification.

According to an embodiment of the invention, a trigger is received by a management function of the OAM (e.g. OAM data analytic function (DAM), NSMF, NSSMF) from a control plane function of the core network indicating one of:
(1) the QoS/QoE of the NSI or NSSI is degraded or going to be degraded in certain T Time.
(2) Indicate the traffic loading of a certain NF(s) or RAN is increased beyond a threshold or decreased beyond a threshold. These NFs may be a RAN function and the threshold may have been specified by the OAM at the NSI/NSSi creation phase or a modification phase.

(3) Indicate the processing delay of certain traffic at a given NF, between two NFs is increased beyond a specific threshold. These NFs may be a RAN function and the threshold may have been specified by the OAM at the NSI/NSSi creation phase or a modification phase.
(4) Indicate a request that the scaling up of a particular NF or scaling down of a NF.
(5) Indicate a NSSI or NSI overall load surpass a certain threshold.
(6) Indicate that the QoS of a specific flow is degraded.

A trigger is received from a network function of the OAM, which is a management function in the management plane instead of a NF in the core network, and may be one of:
(1) Trigger sent by PM about performance (e.g. resource usage) of a certain NF is lower than a certain threshold (or predicted to be as such)
(2) Trigger that the resource usage of certain NF is larger than certain threshold (or predicted to be that)
(3) Trigger that overall loading of a NSSI/NSi is larger than certain threshold In order to receive a trigger from core network, the OAM will inform the Core Network where the traffic should be monitoring and specify certain thresholds. For example, if a certain NSSI is used from another operator, the ingress nodes and egress node are identified and related traffic measurements will be requested from the core network function, e.g. PCF. This may be done as a policy configuration in PCF.

OAM also informs the CN functions the different scaling up/down levels of network functions and each scaling up/down step. It will also inform the current scaling up/down level. The scaling up/down levels may be the resource utilization levels or the traffic carrying capability associated with each level. This would enable the CN function to determine that whether the OAM can do further scaling up if the loading is higher or further scaling down if the loading is lower. This information may be also provided to the CN by the OAM by indicating whether further scaling up or down could be done related to a particular NF whenever scaling up or down action is done by the OQM.

Similarly the OAM will inform the CN whenever a NF or NSSI or NSI is activated or deactivated.

In certain cases, before deactivating a NF/NSSI/NSI the OAM may query the CN function such as SMF or NWDAF whether this could be done without impacting the slice performance. The action is done only if a positive response is received.

After receiving the trigger, the OAM use NSI or NSSI DAM function to determine a suitable action.

While taking action it may check from Core Network Specific information such as:
(1) Traffic loading or QoS information at specific NFs, overall NSSI/NSI flow QoS statistics, QoE level and fairness across different sessions within the NSI/NSSI, etc.
(2) Specific load balancing possibilities If it is an overloading trigger (traffic increase, QoS deficiency, scaling up or activate request) from the CN, the OAM will do scaling up if possible, activate NF/NSSI.

If it an under-loading situation OAM will determine scaling down, deactivate an NF or deactivate a NSSI.

Accordingly, coordination between entities includes those coordinations between OAM and CN as described above. These are shown by the bottom double arrows shown in FIG. 1.

FIG. 1 illustrates, in one embodiment, a scheme 100 for NSSI performance assurance (PA) with conflict management for a non-shared NSSI. The NSI performance assurance includes coordination of steps performed between the OAM DAM and NWDAF.

The NWDAF may evaluate the service SLA key performance indicators (KPI) performance and suggest local traffic handling modifications, such as related to admission control, load balancing, traffic prioritization, and traffic filtering. The policy control function (PCF) may change policies accordingly. Alternatively, it may provide the threshold level crossing triggers for predicted traffic for specified areas (for specific time instance or duration) of the network to SMF/PCF or/and OAM and those functions may be capable of undertaking actions, for example, the SMF may do load balancing, OAM may do scaling up/down, as will be described in further detail below.

If NWDAF is aware of the current network function (NF) scaling state (e.g. resource thresholds), it may trigger scaling up and/or down events (for example by transmitting a message to another entity to initiate scaling thereby). It may also provide such information to another NF in the CN so that this NF may trigger the OAM. For example,
1. if an NF is identified as a possible overloading candidate and if still scaling up or scaling out is possible trigger scaling up/down event for that NF.
2. if a particular NF resource is under-utilized than the amount of traffic the current resource level can handle—trigger scaling down. Amount of traffic that can be handled by current resource level means it could be handled by the next lower level of resource level according to the scaling states of the NF.

If NWDAF is not aware of the current NF scaling status,
1. it will trigger the scaling up event based on resource overloading prediction (e.g. congestion is predicted for a future time) and the OAM may sent a NACK if scaling up is not possible. NWDAF may take other traffic controlling actions if such a NACK is received.
   i. In addition, in certain cases, the control plane based traffic controlling may be done even before receiving the response from OAM about the possibility of scaling up. This may be particularly done if the NWDAF has already learned or informed by the OAM the maximum traffic capacity of the NSI/NSSI (it does not have to wait for the OAM response).
2. it cannot trigger the scaling down suggestion as it does not know how much resource is available. However, OAM can monitor the resource usage and if it is below a certain level it can do scaling down.
   i. If maximum service load is known according to the SLA for a particular NF region, NWDAF can decide on its own the under-load situation (in order to trigger scaling down suggestion) comparing the current or predicted traffic load with the maximum capacity Traffic controlling may include any one or more of load balancing, source traffic blocking (admission control), source traffic smoothing, traffic filtering for the specified set of NF ingress traffic, modifying prioritization in certain NFs handling specific traffic types (region, application, etc.). It is known that such traffic control may be done by different type of control plane network functions depending on the type of controlling, for example, SMF might do traffic load balancing, PCF might specify the prioritization, filtering and smoothing policies based on the regions and there could be separate functions such as AMF for traffic blocking (admission control) for different regions, applications, etc.

Certain conflicting situations may arise if the traffic controlling actions are not properly coordinated, for example, when CP traffic controlling and OAM resource scaling (whether up and/or down) are done independently. The OAM monitors resource usage of NFs. Based on the level of resource usage violating a certain threshold, the OAM may perform scaling up, and similarly scaling down. The control plane function may perform load balancing, session blocking, traffic smoothing, traffic filtering/marking, and prioritization on its own based on the measurements available to it. This includes related instructions to the RAN and associated policy changes.

Example situations & Solutions as follows:

Without knowing NF scaling up/down state in OAM, NWDAF might take steps of controlling traffic (e.g. scaling up), such as:

1. NWDAF obtains the current NF states from OAM whenever scaling is done. NF state means the specific levels at which the scaling up/down is done including the maximum scaling level. If predicted traffic seems to be higher than capable of handling, the NWDAF can request scaling up as it knows the OAM can do further scaling up according to OAM NF state information. If according to OAM NF state information, the OAM cannot do further scaling up, the NWDAF could instead advise appropriate CN functions to take its own actions to control traffic as stated before.
2. Similarly to the above, whenever scaling up is done, the OAM informs whether further scaling up could be done or not. Similarly, after scaling down, OAM informs whether further scaling down could be done. This will allow CPF to trigger scaling based on traffic prediction or to seek for other CPF traffic controlling actions.
3. OAM informs NWDAF the maximum traffic capacity handled associated to a given NF(s)/NSSI. OAM does that using the previous resource to traffic load mapping information or the max traffic allowed as per the SLA. If predicted traffic going to exceed the maximum, NWDAF can carry out traffic controlling actions without conflict with OAM actions.

The NWDAF may predict a sudden increase in traffic when such occurrence might not be timely determined by OAM, and the resource scaling up might be too late. For this situation, NWDAF may provide such prediction information to OAM.

The OAM may predict such sudden increase of traffic based on the outside news (sudden meeting/emergency situation etc.) and if resources cannot be increased it might inform controlling functions to prepare adequate policies in order to have minimum impact to SLAs.

The OAM may activate/deactivate certain resources (NFs, NSSIs) to save energy using monument instructions to virtual network management (VNFM) or RAN management. If the controlling functions are not aware of this, it might take traffic controlling actions. The reactivation may take time and the NWDAF may take unnecessary traffic controlling actions if such information is not available:

1. In the case of deactivation, the possibility of resource increase should be indicated to the control plane, similar to scaling up possibility above.
2. When traffic loading is low, if load balancing is not done, certain resources may be deactivated. This may be known to the OAM by knowing historical data of traffic load to resource mapping options. In that case, the OAM will inform the control plane that these resources are to be taken off and to the traffic handling of the NFs should be done according to a given traffic to resource assignment policy. Or OAM take action, to route traffic to avoid the use of those NFs and once it is completed inform the OAM (alternatively OAM notice the idle NFs and deactivate them after observing the traffic handling capacity of the other NFs).

Figure 2A:
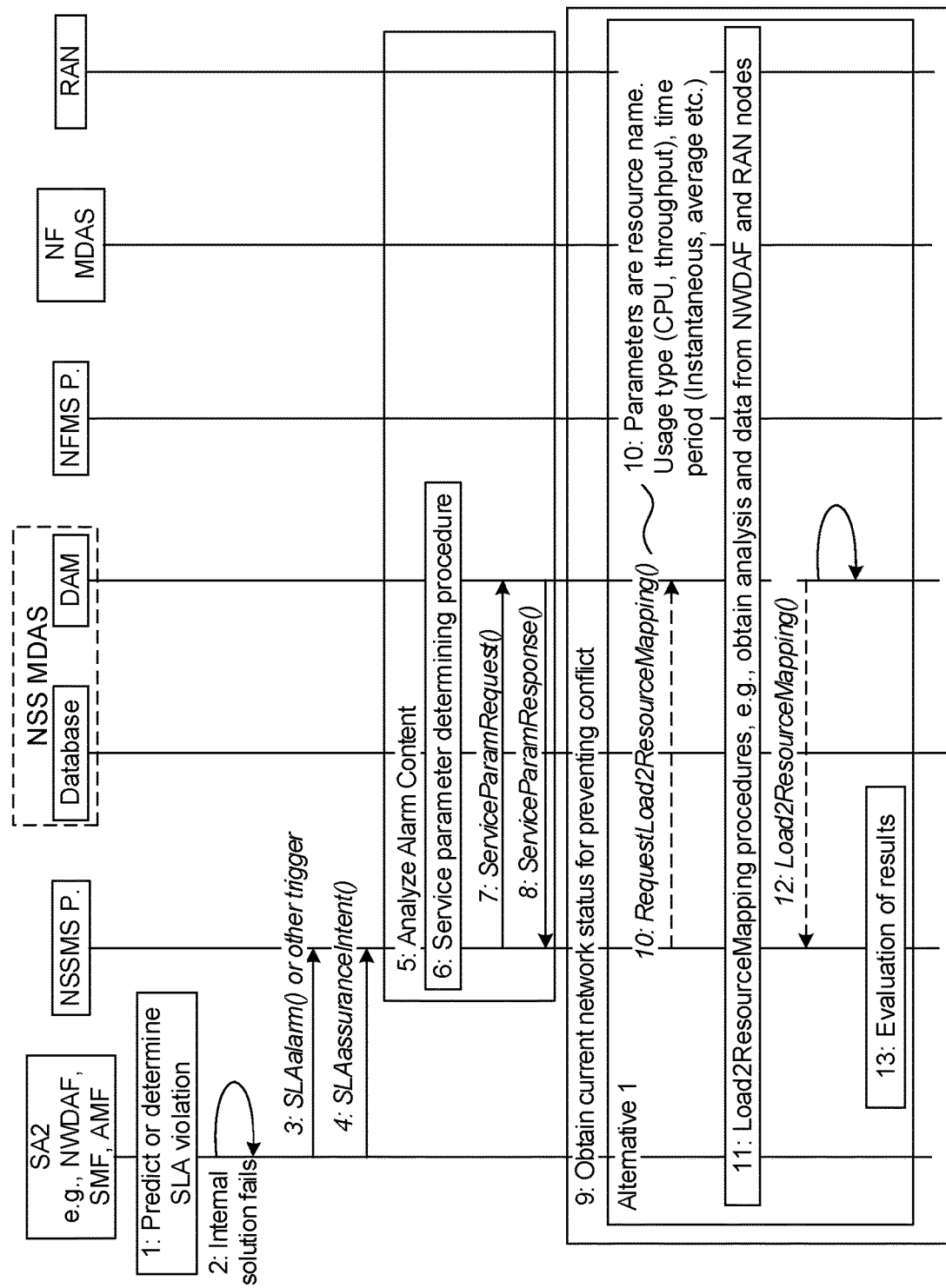
FIGS. 2A, 2B and 2C illustrate, in one embodiment, a call flow procedure for performance assurance when an SLA is violated for a case of an isolated NSSI.
Figure 2B:
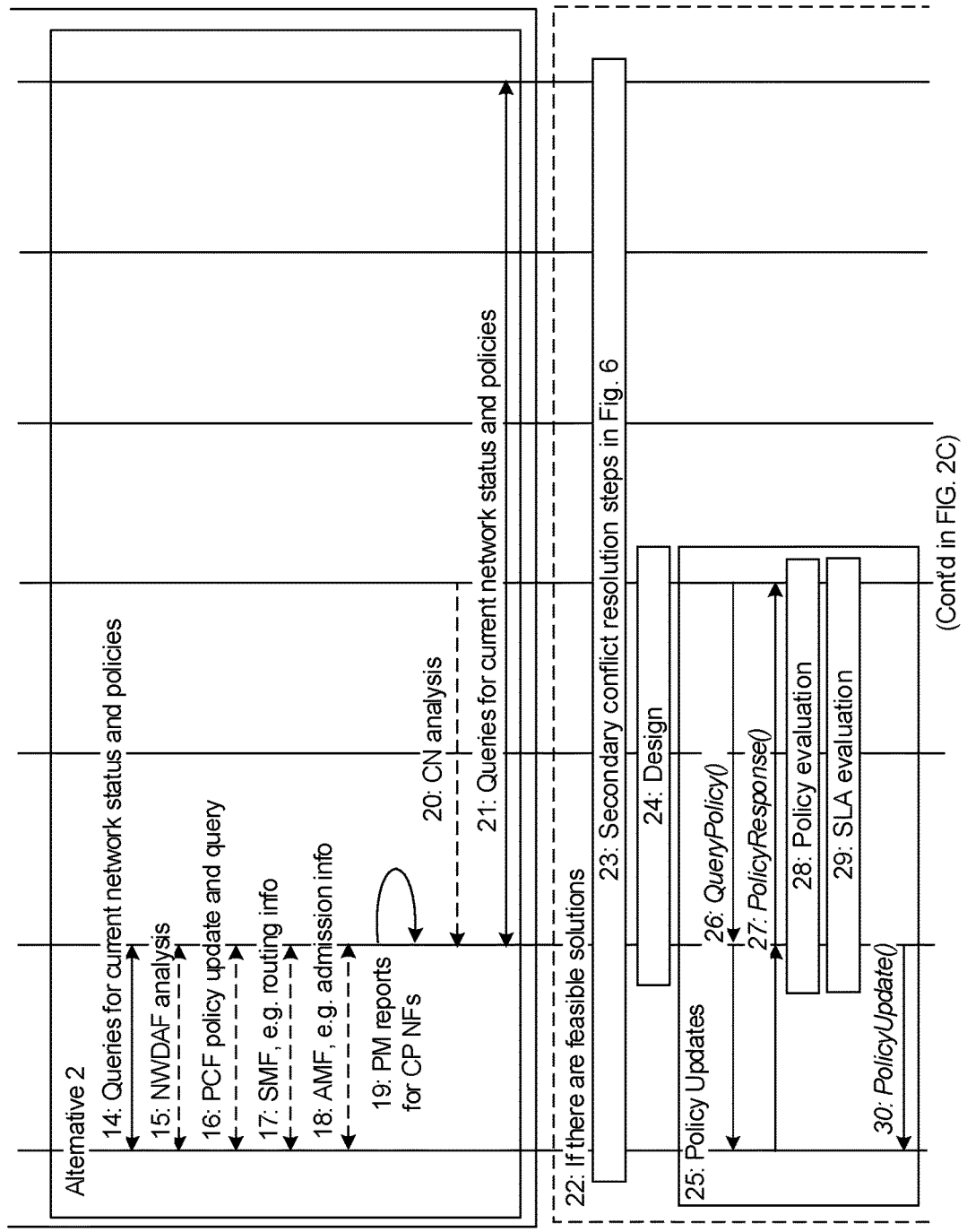
Figure 2C:
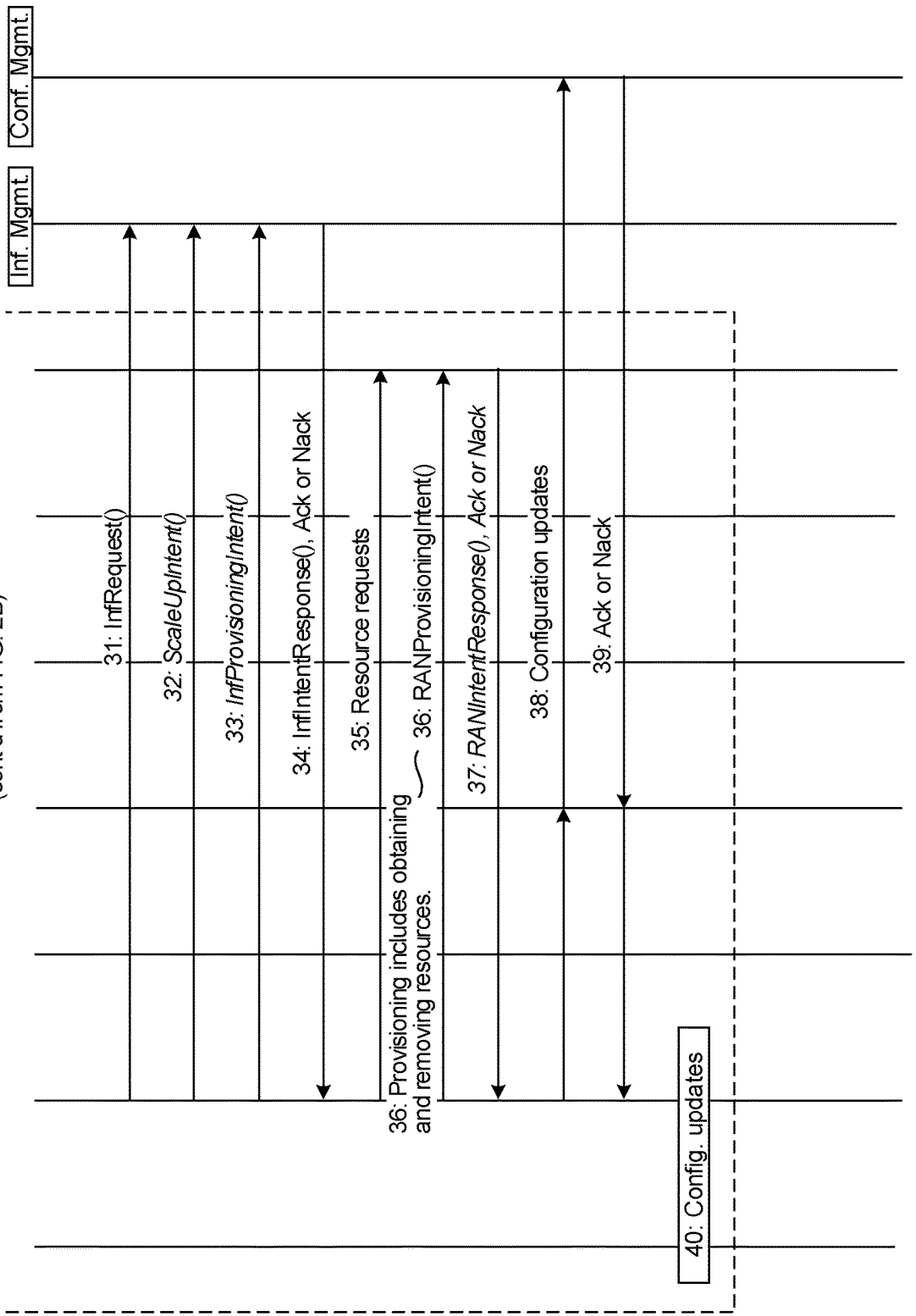

FIGS. 2A, 2B and 2C illustrate, in one embodiment, a call flow procedure for performance assurance for a case of an isolated, or non-shared, NSSI when the SLA violation is determined or predicted by SA2. In particular, SA2 identifies and/or predicts the NSSI SLA performance is dropped or is about to be dropped for at least one atomic service. SA2 applies load balancing, and re-routing of certain traffic. As used herein, the term "atomic service" represent the smallest granularity level of communication services which may defined in different ways as described below. If not resolved, inform OAM with details of the impacted services. SA5 (OAM) attempts resource re-organization, such as scaling out, acquire more resources from other slices etc. based on the policy and the SLA. OAM also checks if the predicted traffic load is higher than that in the SLA and if so, inform the customer to see whether the customer wants to re-negotiate the SLA (not shown in FIGS. 5A and 5B). If solution by way of the resource re-organization cannot be found and predicted traffic loading is lower than the SLA, take action to modify the SLA with penalty payments if applied or have a permanent solution by buying more resources. If solution using the resource re-organization still cannot be found and traffic load is higher than the SLA, inform SA2 to do traffic filtering at the ingress points of the services. In addition, new arrivals whose traffic goes through this NSSI may be curtailed (Admission control). Also, SA2 may inform the customer management system or customer traffic control function (identified/instantiated before) regarding the extra traffic loading details.

In particular, FIGS. 2A-2C describe a case of performance assurance for a communication service provided using an NSI or NSSI which is not shared with other communication services. In particular, as depicted in FIG. 2A-2C; however, the service provisioning steps are not described in these figures as it is assumed that the service is provided, policies for traffic handling are provided to control plane functions with all the service information such as initial capacity allowed according to SLA, and the NSI now in operational phase. The steps are as follows:

Step 1: A control plane function in the control plane such as AMF, SMF or NWDAF determine a SLA violation or predict an SLA violation in near future.

Step 2: Depending on the policy configuration done by the OAM, it may first do the traffic controlling actions using control plane functions (traffic prioritization or blocking, traffic rerouting, load balancing, admission control of new sessions, etc. as in step 2. Different CN functions may be responsible for different traffic handling actions, e.g. SMF for load balancing, user plane functions for traffic prioritization, filtering.

Step 3: If CN functions cannot find a solution, a CN function accordingly informs the OAM in this step. In certain cases, the policy provided by the OAM may request to directly inform the OAM for a possible solution as in step 3 without going through step 2. In some cases, the policy (configured by OAM) indicates certain thresholds of traffic for NFs, NSSI ingress points etc. so that if the current traffic or traffic prediction exceeds these thresholds the CP functions will trigger scaling up to OAM and if goes below certain thresholds it will trigger scaling down to OAM.

Such requests may indicate the time duration for which these predictions and requests are valid. The OAM will match these thresholds with NF states or NSSI state levels such that each NF/NSSI state has its corresponding scaling up and scaling down thresholds.

In some cases, the policy configured by the OAM will indicate that OAM will inform the possibility of further scaling up/down after carrying out a scaling up/down action for a NF or NSSI. In this case, the CPF will trigger scaling up (when congestion happens) only if at that stage OAM had already indicated that there is a possibility to further scale up or down. Otherwise, when congestion is predicted, the CP functions will take traffic controlling actions. If OAM indicates that further scaling down is not possible, the policy might indicate to the CPF to request deactivation of the NF/NSSI or allow more traffic (e.g. best effort) to the service.

Step 4: The trigger can also be provided as an intent (i.e. SLA assurance intent with related parameters such as duration applicable, the NSSI/NF applicable etc., and the OAM will need to analyze the intent in step 5.

Steps 5/6/7/8: OAM will analyze the trigger using MDAS which would propose service parameters for actions such as NSSI modification, scaling etc.

Steps 9/10/11/12/13: After the service parameters are decided the OAM NSSMS_P will evaluate the new capacity boundaries using MDAS (e.g. that associated with the current scaling level) and implement the suggested modifications including resource modifications such as scaling up or/and scaling down actions Steps 14-18: These new capacity boundaries will be provided to the CP functions if the boundaries and thresholds associated with the current state of the network have not been given to the CP functions before. Note that this is informed as a policy change and CN continue to monitor the system to provide further alarms Step 19: OAM receives PM report for NFs. The following steps describe the procedure applied by the OAM if further to the trigger to the CP input if a PM report is also received which shows a slice deficiency such as resource loading level reaching the maximum allowed. The following steps also describe an OAM based solution where even without a trigger from the CP, the OAM DAM evaluates the measurements.

Steps 20/21/22/23/24: If there is a solution and if the current policies are not appropriate with the current network status, the slice may be redesigned and modified.

Steps 25-30: new policies may be configured in the CP functions such a PCF, SMF. If needed, renegotiate and SLA is updated.

Steps 31-40: A solution may include obtaining additional infra-structure and depending on the success of obtaining the infra-structure the configurations and policies may need to be updated.

Other triggers for performance assurance may apply as follows:
1. Triggered by SA5 overload:
   i. OAM DAM predicts resource overloading event for certain resources. Alternatively, if service load prediction from SA2 is available and if that also indicates future overloading, the system follows steps starting from the resources re-organization.
2. Triggered by SA2 underload:
   The OAM setup under-loading thresholds for the service loads for different resource scaling state combinations during slice establishment. In certain scaling state, SA2 identifies that the service load drops below the under-loading thresholds. It will inform the OAM with the predicted traffic load. (Step 100) OAM scale-in, deactivate or release the resources for other slice use, according to amounts decided using the resource to service map or using DAM.
3. Triggered by SA5 underload:
   i. SA5 detects according to pre-set resource usage thresholds (which maps to the current scaling-profile). SA5 may optionally check with SA2 traffic load before performing any additional actions.

Triggers in FIGS. 2A and 2B can be any of the triggers described above. In addition, these triggers may be received from any component used by the network slice such as RAN or TN.

Regarding Policy updates (14) in FIG. 2A: Policy updates include policy change relate to session admission control related to a NSI or NSSI. This may occur when NSI or NSSI input traffic is to be controlled (for example, by blocking sessions related to specific applications) or input traffic control to certain NFs or NSSI ingress points (for example, which flow packet should be dropped at a UPF when congested, or which packets/flows has priority to reduce delay at certain NFs or between on NF to another NF), or allow QoS degradation for certain traffic of that NSI or another NSI or group of sessions.

If a trigger is received from the OAM management function for a resource increase, the OAM may make a determination to request a load balancing action from the CN before increase of resources so that to check whether specific load balancing action could resolve the issue (if that request is accepted by the CN, then OAM does not have to do the resource increase until another trigger is received).

Regarding the RAN scheduling and prioritization policy, RAN traffic assignment for FIGS. 2A and 2B may be included in policy update (14/19) description.

In embodiments, the policy query may also include obtaining CN traffic loading, NSI QoE states (e.g. % satisfied users of this slice or service group-current or predicted).

In embodiments, RAN provisioning intent (Step 25 of FIG. 2B) may include RAN resource assignment modifications or RAN resource activation/deactivation messages related to the resources used for the NSI/NSSI.

Figure 3A:
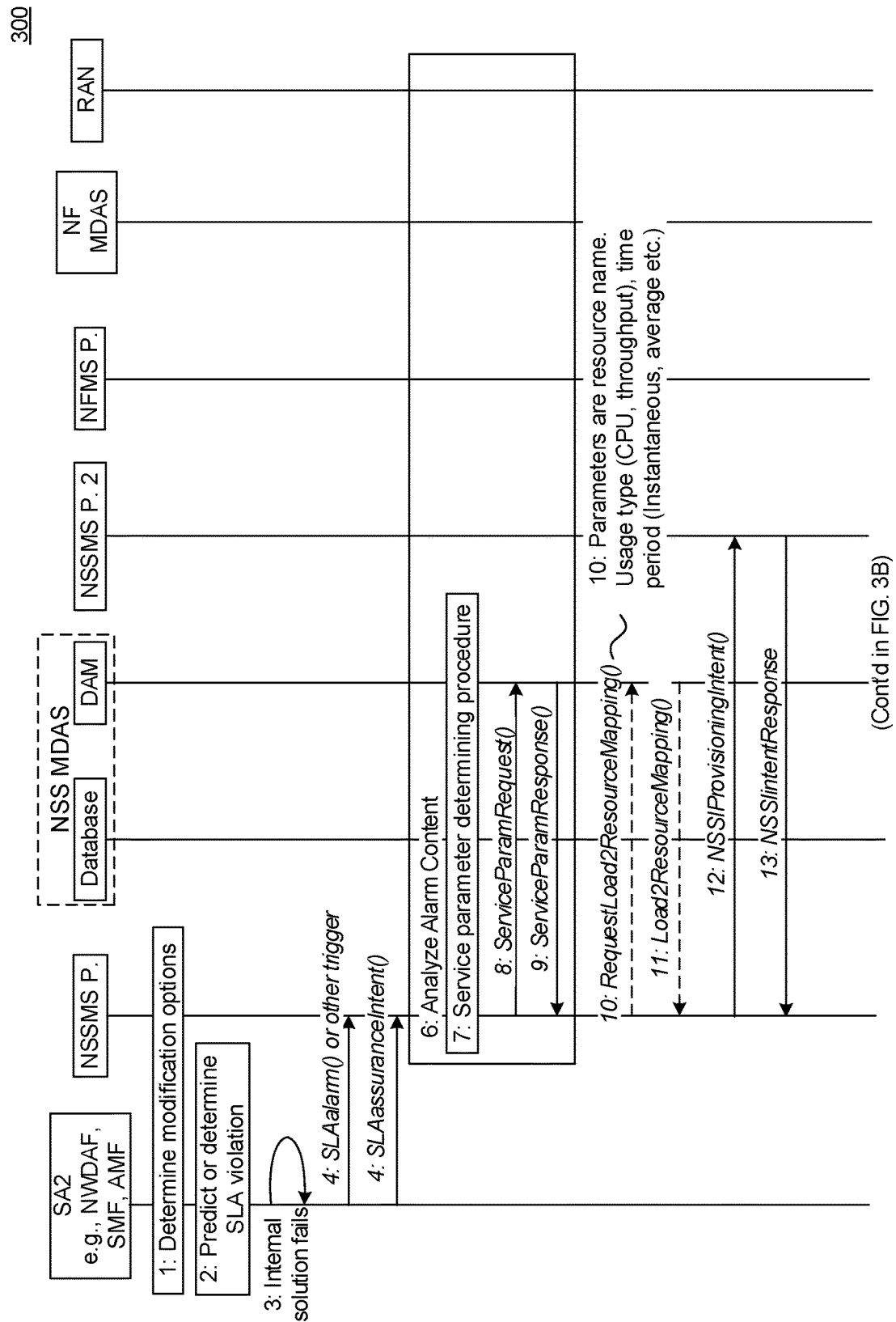
FIGS. 3A and 3B illustrate, in one embodiment, SLA performance assurance for a shared NSSI.
Figure 3B:
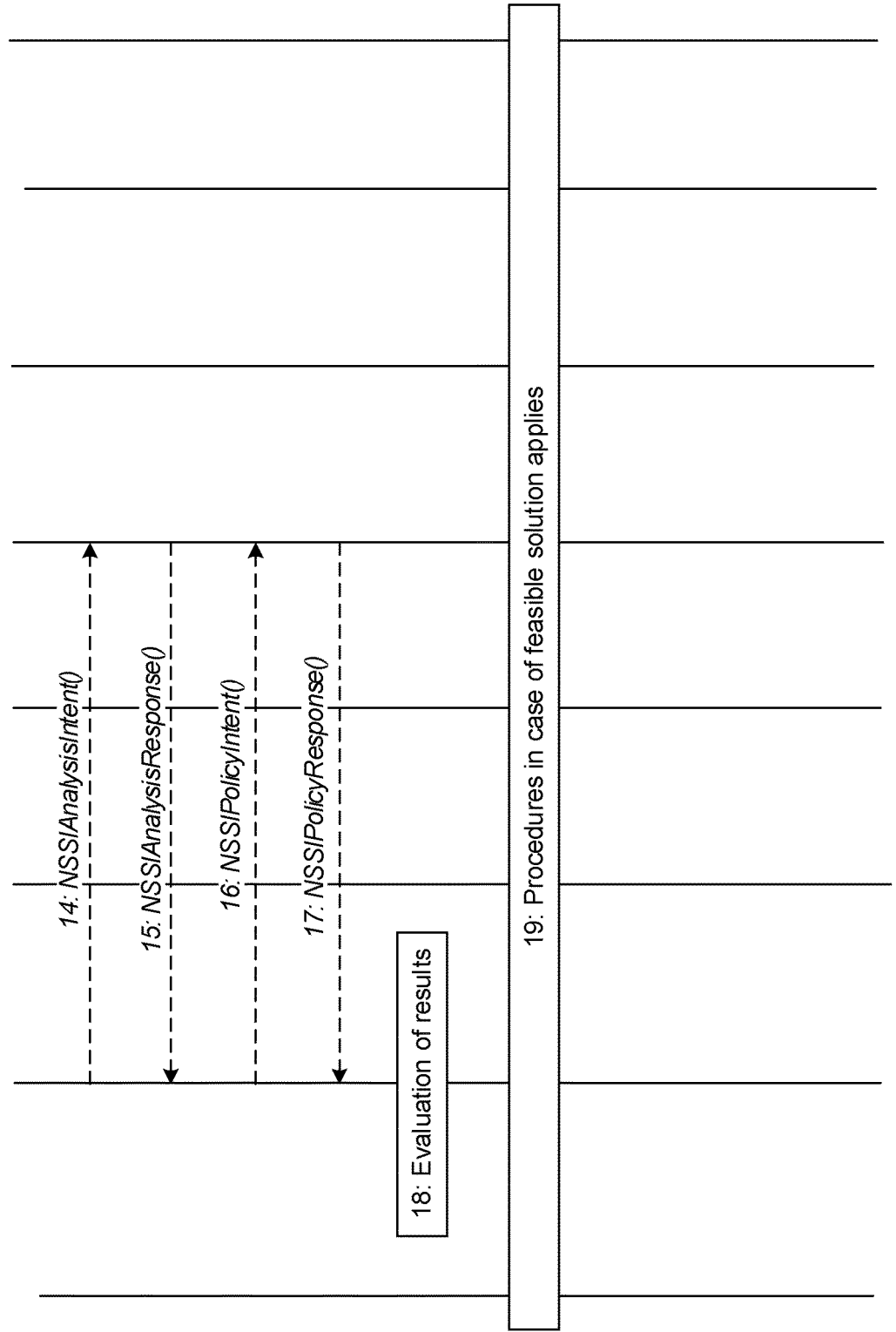

FIGS. 3A and 3B illustrate, in one embodiment, SLA performance assurance for a shared NSSI.

Differently from previous cases, if the NSSI is used as NSSI as a service (NSSIaaS) or as a communication service from NSSI providers, intents regarding management of NSSI can also be sent to the other mgmt. service provider(s).

Steps are as follows, once a trigger is received from SA2 or RAN, or other network management entities.

The trigger may be based on a prediction from SA2 or an analysis from NWDAF or other analysis entity in SA2. The content of the message/trigger is analyzed in Steps 6 to 9 shown in FIG. 3 and described below:
1. Service requirements can be parametrized via ServiceParamRequest( ) sent to a data analytics service provider.
2. The DAM provider may request historic data from a database, which can contain a catalogue.
3. The DAM provides the ServiceParamReport, which helps to prepare a network slice (subnet) provisioning (allocation, modification etc.) request with requirements.
4. These actions can be performed internally by one entity, or a service-based architecture can be used.
5. If the trigger already contains enough information and parameters, above steps 1.-4. are not needed.

The NSSMS_P sends RequestLoad2ResourceMap( ) to DAM_P (step 10 in FIG. 3).

DAM_P requests load analysis (e.g., prediction), and information (e.g., current load) and prepare Load2ResoruceMapping( ).

NSSMS_P receives Load2ResourceMapping( ) which includes the pareto-capacity boundaries, and different service provisioning options for a specified resource level. As explained later, pareto boundaries are the boundaries representing maximum capacity combinations of the services provided by an NSSI.

NSSMS_P may decide to send a NSSIProvisioningIntent( ) to another NSSMS Provider based on the above analysis
1. If the NSSMS_P has access to more detailed information about the NSSI provided by the NSSMS_P_2, NSSMS_P can either
   i. Prepare a detailed NSSIProvisioningIntent with parameters or
   ii. Use the following messages (with the dashed lines in Steps 14, 15, 16, and 17 in FIG. 3)
2. If the NSSMS_P has full exposure, instead of intents it can send specific request with detailed parameters for provisioning.
3. NSSMS_P_2 may have an internal intent translation engine, or may use the services of an IDM service provider.
4. A design is prepared if there are any topology changes.
5. DAM can provide policy updates, e.g., updating ingress/egress points, load balancing.
6. InfRequest( ) may be sent, if more physical resources are needed. Similarly, VNF requests can also be sent to MANO or DM, EM.
7. Configuration Mgmt services are utilized to apply changes and inform network entities.

For NSIaaS ('Network slice as a service' described below) the intent levels are:
1. Intent can be the communication service instances (CSIs) that need to be supported using any of above options then the (network Operator) NOP selects a suitable network and provide a manageable NSI to the customer.
2. Other levels of intent are the customer gives NF chains+traffic loads (2), Topology (3), Topology+Capacity/resource (4).

In other words, providing atomic services demand and others corresponds to the case known as NSI as NOP internal, where NSSI is provided as a communication service instance (CSI) without exposing the NSSI to the customer and providing the NSSI details corresponds to the case known as 'Network slice as a service' (NSaaS) where NSSI is provided to the customer with internal network details such as the network topology.

When a faulty condition is monitored it will trigger a message to the evaluation entity. The management then evaluate the impacted resources and estimated the available capacity. The network can try to find out other Pareto boundaries where the service requirements could be satisfied or which provides minimum impact solution and select that. If all the services cannot be satisfied, some of the services need to be downsized. It may involve modifying the SLA. It can also change the standby resources to active mode (Cells switched off to on or place a mobile BS to the impacted area with minimal cost solution or asked for new resources from another infra-structure provider.

Figure 4:
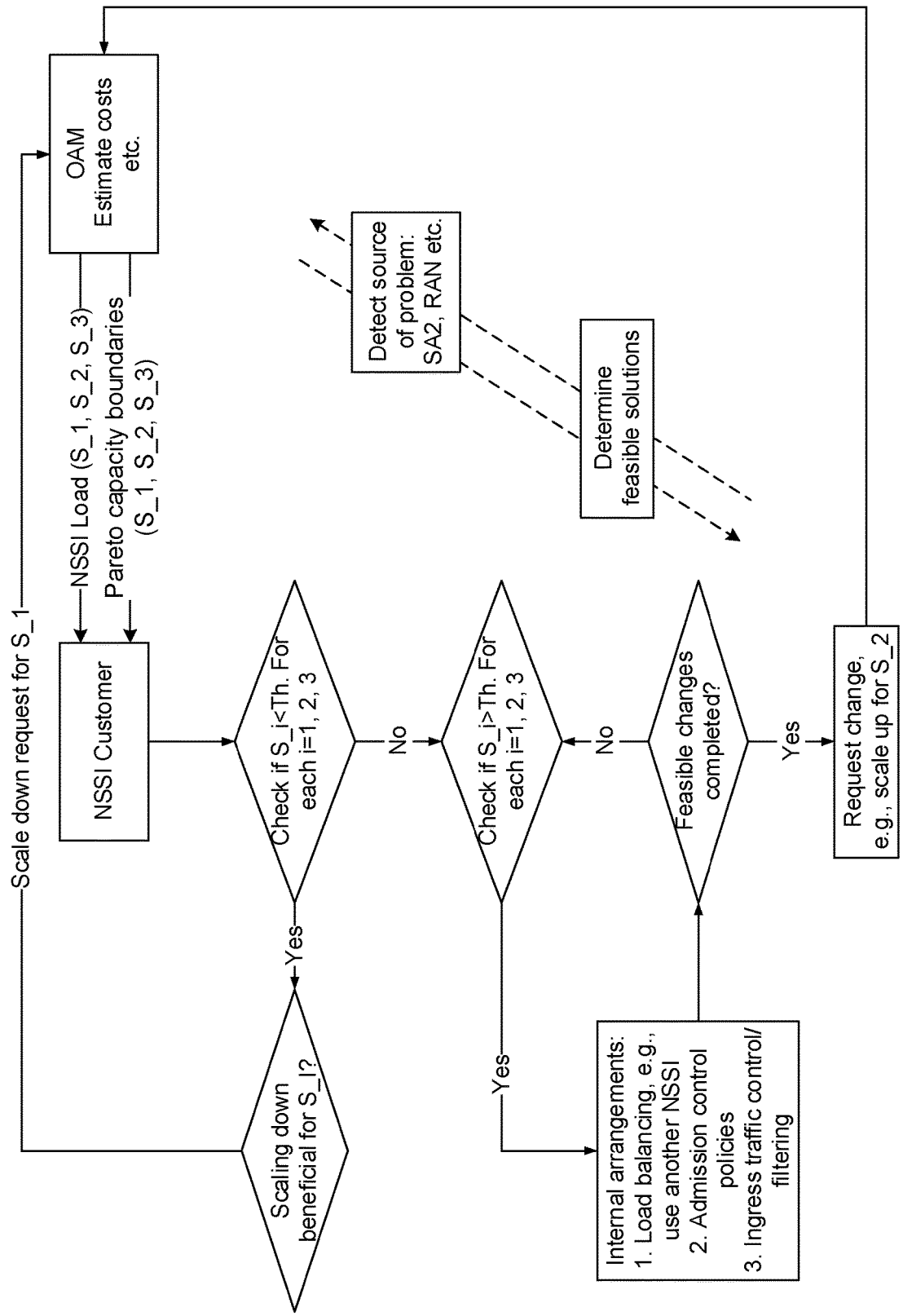
FIG. 4 illustrates, in one embodiment, a generalized flowchart scheme for performance assurance under different scenarios.

FIG. 4 illustrates, in one embodiment, a generalized flowchart scheme for performance assurance under different scenarios. Various actions as depicted may be taken by the NSMF and NSSMF based on the loading level of the NSSI, including but not limited to trigger scaling in/out, session admission control, and traffic control of NSSI by the NSMF.

Similar steps may be taken when network congestion is identified. The control plane will include the capacity thresholds and enabled to compare the thresholds with current loading. Base on detecting threshold violations, the control plane may inform and request the OAM to scale up/down or use a traffic control method to control traffic routed to the NSSI.

In wireless networks with slicing, it is important to use network load and capacity efficiently, to avoid waste of resources. An understanding of load and loading conditions aid in adjusting operational policies accordingly.

Furthermore, above descriptions also describes the following options embodiments. When a NSSI (or NSI) is requested by a customer, the NSSI provider first assess the resource requirements for that service and if available create the NSSI with an initial set of resources. These resources may be evaluated using a DAM or already there is an available Load2Resourcemapping with the provider. The OAM then inform the associated RAN manager or the CN functions providing communication services using this NSSI the policies and service parameters such as admission control parameters including the initial capacity provided to the service for different areas, for example as number of users or number of PDU sessions as described below. After provisioning, the control plane functions and RAN will do traffic controlling actions such as admission control according to these policies and parameters provided by the OAM. In addition, specific coordination rules may be established in the policies provided by the OAM to RAN and CN. For example, in one embodiment, the OAM may provide the CN and/or RAN the slice requirements including traffic controlling parameters (e.g. service load that is allowed/designed for) and other policies (e.g. admission control, priority)) and further modification of the slice may be done based only on inputs received by other management entities of OAM, e.g. fault management (FM) and performance management (PM) without depending on the CN function inputs. These management inputs may be analyzed by the DAM which would indicate triggers to modify the slice to address a particular situation currently exist or predicted for a future time. This may modify the resources and also provide new parameters and policies to the CN or RAN so that CN/RAN can control traffic and does other activities based on the new parameters and policies. In another embodiment, OAM may use analytical information from CN/RAN functions (e.g., traffic congestion, slice performance degradation, traffic prediction from NWDAF with or without reasons, NF-NF logical transport link performance degradation, suggestions from RAN based on its analytical functions), in addition to the OAM based information for the OAM analysis (e.g. done by OAM DAM) to prompt slice modifications. In another embodiment with elaborated coordination between OAM and CN/RAN, the OAM configure CN/RAN functions with conditions for various triggers that CN/RAN can make to OAM for consideration in slice related modification. Such triggers CN/RAN functions can provide to OAM could include for example, current or future congestion situation in a specific area with or without including the reason, current or future service degradation, suggestion for network function scaling (e.g. scaling up/down), slice capacity increase/decrease requests and various other triggers discussed in previous subsections. For example, OAM might set up a traffic load threshold for a certain slice or an NF, over which the CN should trigger for capacity increase trigger. In all above cases, for the transport network, OAM may provide transport requirements to the TN manager and TN manager may in turn provide triggers for modification similar to above.

Various usage scenarios appear as a result of the following factors:
1. The NSSI may be isolated/non-shared or shared.
2. The NSSI may provide multiple services or a single service.
3. Information on NSSI may be fully closed, or exposed to some extent.

Among possible combinations of the above factors, the simplest one may be an exposed and isolated NSSI providing a single service. The other combinations require unique loading and capacity handling methods as will be discussed in the following sections.

There are several methods of abstracting an NSI/NSSI for service provision and quality assurance. Some examples are:
1. Service Capacity Boundaries (e.g. Pareto optimal): useful to the NSSI customer to control admission, load balancing, service filtering etc. The remaining capacity when the network is loaded to a certain level could also be evaluated as Pareto optimal boundaries and used.
2. Service specific maximum capacity: Absolute maximum quantity of a service that can be provided by the NSSI if other services are not present (S1_Max)
3. Service loading to resource usage mapping: useful for the NSSI provider to identify the resource requirement.
4. Current percentage service loading: for the NSSI customer to identify how much the system is loaded when there is no knowledge of resource usage to the customer. There are several proposed metrics each could be used for different purposes:
    i. Service specific loading (when other services absolute loading is given): How much more services from a particular service could be added without impacting other services.
    ii. A weighted combination of each load.
    iii. Correlation of services with each other, e.g., in terms of occurrence probability and load requirements.
5. Current percentage resource usage: Similar definitions as above. There are few different metrics,
    i. A weighted function of the percentage usage of the bottleneck resources (sum, mean, max, min).

For shared NSSIs, resource usage of each slice may be identified (as monitored separately). Scenarios may include when NSSI is managed by a different manager than the NSI manager or when NSSI is shared among two NSIs.

An NSSI manager (e.g. NSSMF) may provide an NSSI (to NSMF) in several ways:
1. Network Slice as a service (NSaaS): As a network or infra-structure fully exposed with full management and controlling capability where NSMF can use it as an integral part of the NSSI.
    i. A generic set of infra-structure resources with full controllability to the NSMF to instantiate necessary NFs, configure them and manage and use them.
    ii. A set of NFs (including associated resources) with connectivity (no NF chains/Topology)
    iii. A set of NFs connected with specific capacity links forming a network with specific topology and NF chains
2. Network Slice as NOP internal: As a closed network without exposing Internal NSSI network structure
    i. E2E (end-to-end) service capability is specified with ingress and egress points/areas. This service capability or service loading requirement may be specified in many ways as described elsewhere in this document.

For types 1 (i) to 1 (iii), resources need to be identified and provided to the NSI manager. There are several ways resources could be provided:
1. If resources are hard sliced, their use for multiple NSIs is trivial. Even for this case, NSSI loading information is important as NSSI resource usage policy and/or NSSI resources needed to be adjusted.
2. If resources are soft sliced between multiple NSIs how the resources are assigned to each NSI and how the NSMF do control/management of its resources to guarantee KPIs is not clear.
3. NSSI loading is related to resource usage. In other words, some information about network resources are known and that enables resource management based for current/predicted/requested demand.

In some cases, the particular resources may be unknown, and only the service capacity is exposed to service customers as in the case of NSI as NOP internal.
1. The NSSI SLA specifies the e2e service capabilities and related KPIs provided by it (i.e. only service capability is negotiated for the SLA using specific KPIs). The NSI Manager obtains the current loading.
2. NSSI loading is related to service level loading related to service capacity specified.
3. AN NSSI may provide different services. For different services, loading and capacity definitions may be different. Examples:
    i. Link Loading and related capacity limitations:
    ii. Two services provided by an NSSI may be: User plane traffic carried from A to B and C to D. Only C to D may be full but not A to B. ☐ loading depends on the service type (capacity of each service may be interdependent)
    iii. Node resource limitations:
        1. Shared UPF: NSSI may provide traffic aggregation service. An NF (NF A) may aggregate input traffic form A1, A2 and A3 received at the NF A and send to node B. IF NF computing/memory capacity reaches 98% it would not be able to handle further traffic increase. Computing/memory capability at NF can be the bottle neck
        2. Shared CPF: An NSSI may use an AMF for multiple slices. IF AMF computing/memory resource usage reaches 98% level there is a risk that it cannot handle further increase of input requests.
        3. RAN network functions has probabilistic capacities that depend on channel conditions, user density and so on.

Note that if NSSI provide service X, and Y, NSSI capacity=f(X, Y). The function f(•) depends on many factors, such as slice resource allocation policies, such as conditions under applicable SLAs.

The load of a slice may be calculated in several ways. For describing load different aspects could be considered, including:
1. Bottleneck—the entity with the minimum available capacity
2. Usage of network entities (e.g. resources)
    i. Total
    ii. Average
    iii. Max
    iv. Min 3. Usage statistical interpretation of services and links interconnecting the network entities/nodes
    i. Total
    ii. Average
    iii. Max
    iv. Min
4. Area
    i. E2E slice
    ii. Section of a slice
    iii. Combination of subnets
    iv. Tracking area
    v. Bins/location of interest
5. Calculation time window
    i. Instantaneous (current window)
    ii. Average ((over several windows)
    iii. Expected (over a future time window)
6. Units/measures
    i. UL/DL throughput
    ii. # of subscribers
    iii. # of PDU sessions
    iv. Delay/latency Due to these variations, load should be identified based on characteristics of the traffic, and service requirements, including the relation between loads of other services on the slice, and capacity left for a new service. Since this is specified in terms of services it is provided at a given time this refers to service load and this is different from the load described in terms of resources the slice used which is termed as 'resource load' elsewhere. Furthermore, the load can be described as a combination of both service load and the resource load.

In this document service load of a slice is described using one or more of the above aspects. For illustration purposes the following two examples are provided. The service load can be the combination of atomic services each of which is described by the amount in units described in item 6 above (e.g. throughput) as a statistical quantity described in one of the terms in above 3 (e.g. max, min, average etc.), for a geographical area as described in (4) above, for time window as in (5) above (average over several time windows) and for the bottleneck entity as in (1) above or for overall network slice.

Figure 5A:
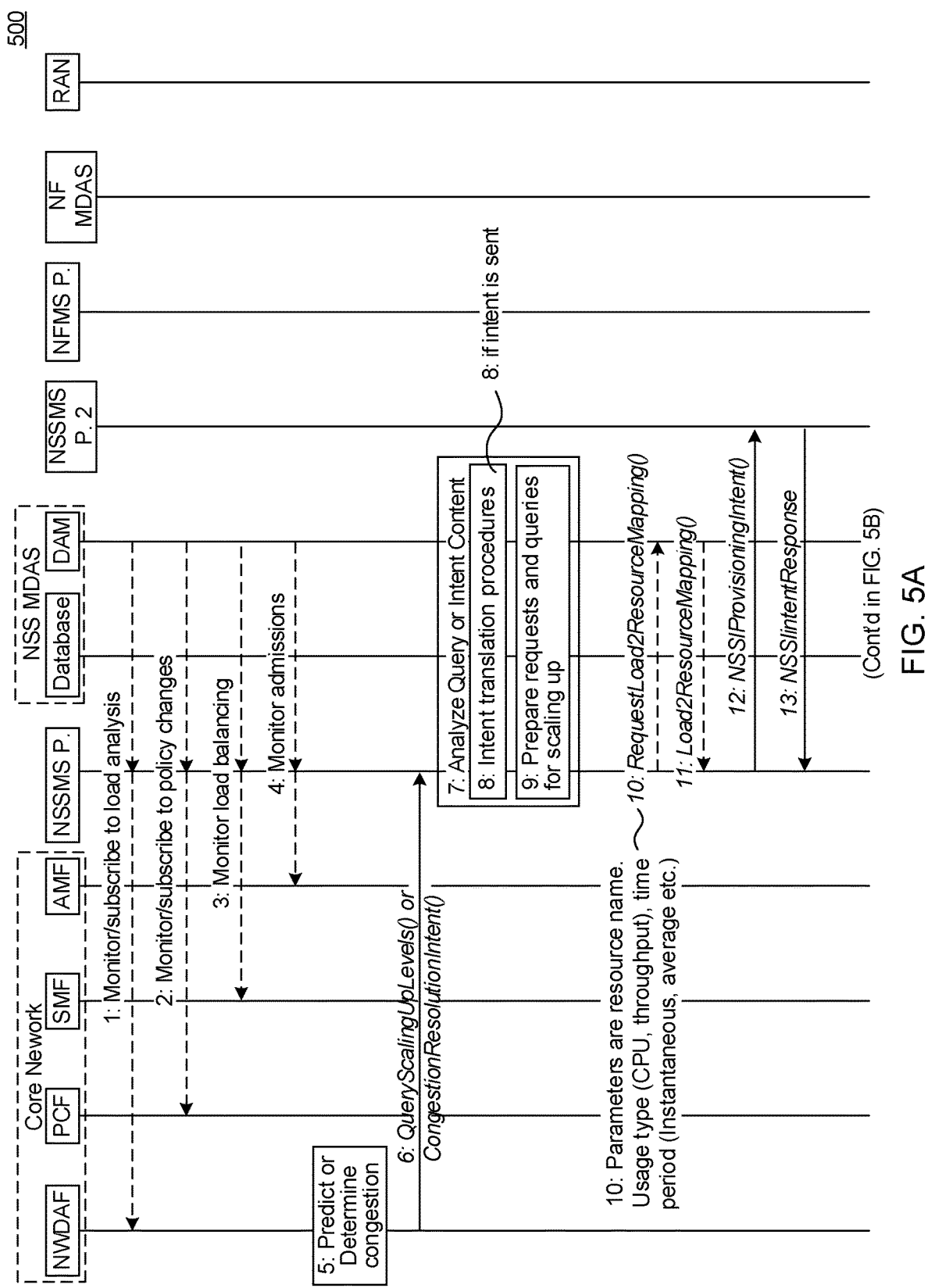

FIGS. 5A and 5B illustrate, in one embodiment, an overview procedure 500 for scaling up of network resources with conflict prevention.

At steps 1-4: Management system closely monitors working of core network as a part of end-to-end performance assurance. In particular, management data analytics services (MDAS) can evaluate the current network situation, and make predictions on long-term (as compared to analysis of NWDAF) network resource utilization and service demands. These results may be monitored via subscriptions and queries (dashed lines) or obtained from a database.

At step 5: NWDAF predicts congestion that will potentially cause traffic controlling to block some users/traffic. Alternatively, MDAS may predict shortages of resources that will potentially cause violations of SLAs that cannot be solved with the current resources of the core network (CN).

At steps 6-9: Can be intention based (requiring intent translation services from intent based network management service provider) or request based (the customer of the request needs to know details of network).

In embodiments, the QueryScalingUpLevels( ) message in Step 6 contains information indicative of some or all of the following: the network segment associated with this request, indication of the service types, current load, NSI/NSSI IDs, service IDs, service instance IDs and other information, network topology, valid time, enquiry time, subscription to automatic updates, database address, database location, preferred databases, current network policies, current network configuration, network parameters, raw and analysed data about network traffic, and other information that is necessary for the OAM to determine scaling up levels. The CongestionResolutionIntent message may contain solely higher-level information, such as the network segment associated with this request.

At step 22: After all queries are finished, which are not needed if there is Load2ResourceMap and catalogue/database, NSSMS P. determines scaling levels. For instance, it can mean that the network resources can be increased 2×, 10×, and 15×. The levels in between may not be possible, as well as, increasing network resources more than 15× may not be possible.

At steps 24-26: Related core network control plane functions are informed about the scaling up levels, and where applicable, configurations of CP NFs are updated. That includes policy updates, e.g., such that SMF and AMF do not block user traffic, but initiate scaling up request, if the associated scaling up limit is not reached for a particular scaling level. Similarly, certain policy updates may indicate that the CP function (e.g. NWDAF, PCF) should request a scaling down request if the traffic loading prediction reached the scaling down limit associated with the current scaling level. These scaling requests may be applicable certain future time period.

Figure 6A:
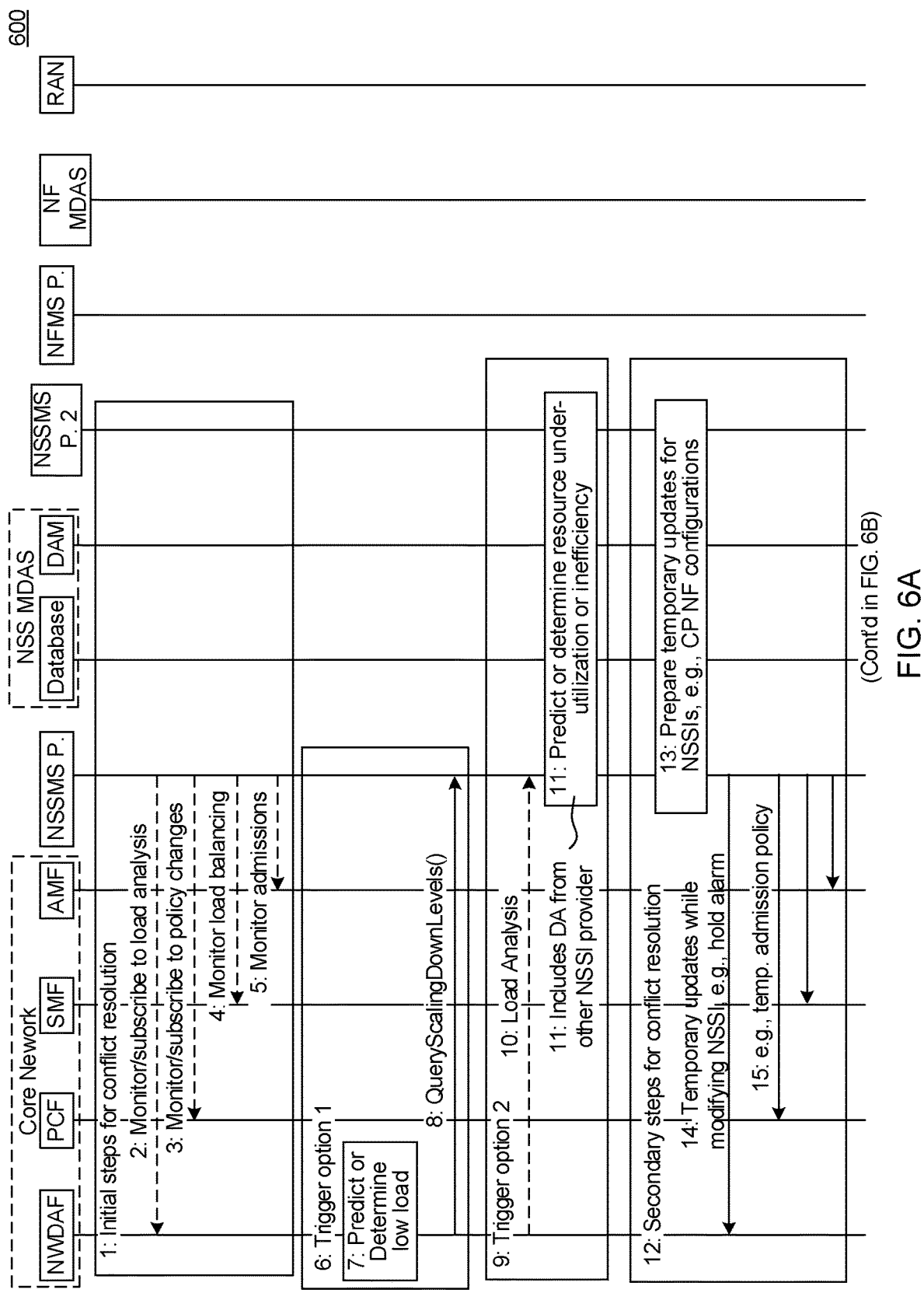
FIGS. 6A and 6B illustrate, in one embodiment, an overview procedure for scaling down of network resources with conflict prevention.
Figure 6B:
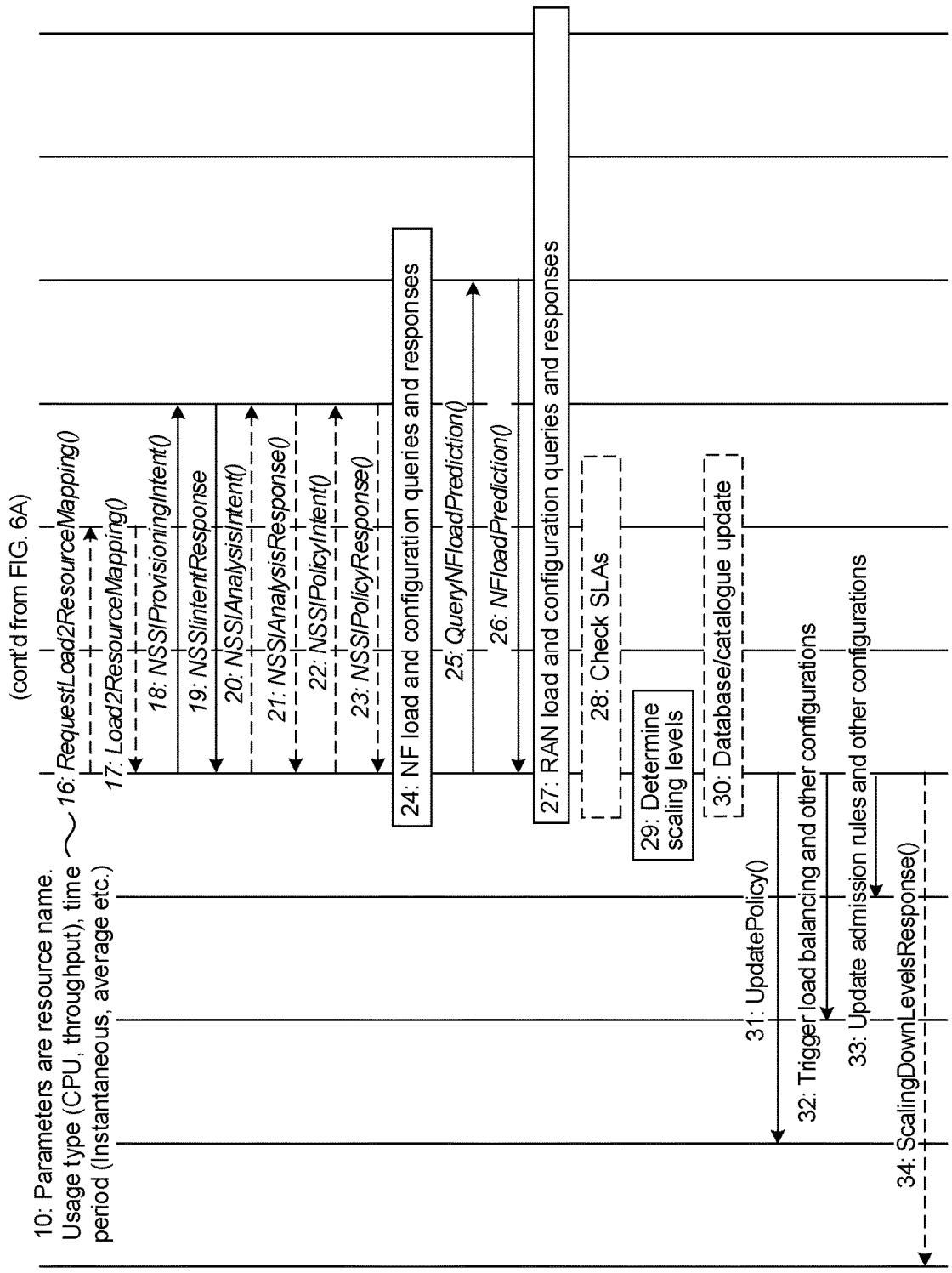

FIGS. 6A and 6B illustrate, in one embodiment, an overview procedure 600 for scaling down of network resources with conflict prevention. In counterpart to the scaling up procedure, scaling down can be triggered by NWDAF or NSSMS P. upon detecting under utilization of network resources. The output of the scaling down procedure may be updating of policies and configurations of SMF and AMF. For instance, traffic is not routed to the under-utilized resources, so that such resources can be shut down.

Figure 7:
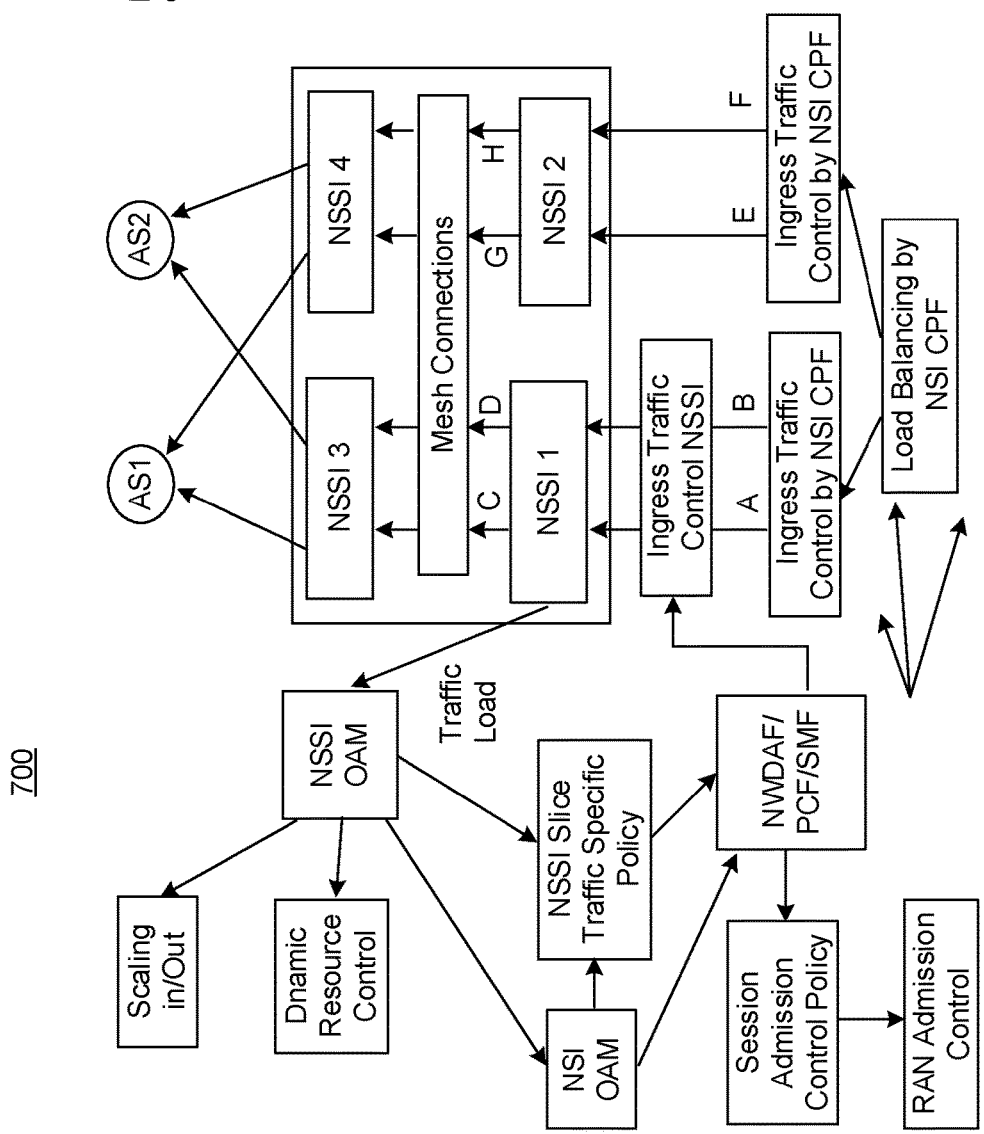
FIG. 7 illustrates, in one embodiment, an example scheme for NSSI loading and capacity usage.

FIG. 7 illustrates, in one embodiment, an example scheme 700 for NSSI loading and capacity usage, particularly applicable to scenarios where the NSSI is of a different domain or a different provider as used by the NSI. In some embodiments, all the NF/NSSI loading and capacity discussed in this document refer to the respective descriptions indicated below for these performance indicators including how they are determined.

Figure 8:
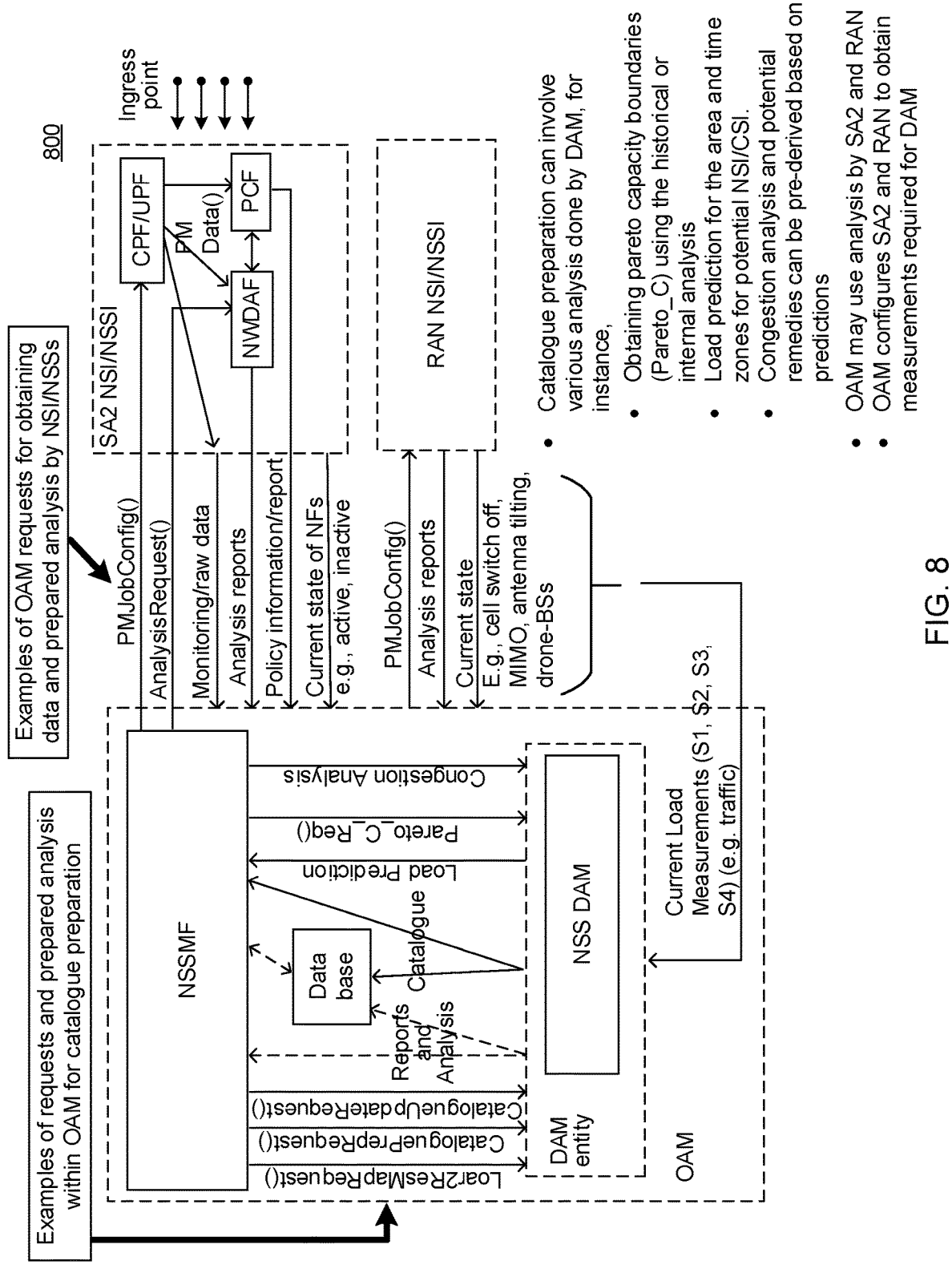
FIG. 8 illustrates, in one embodiment, a scheme of using load and capacity mapping for performance assurance.

Atomic services may be provided at the ingress and egress points. Atomic services represent the smallest granularity level of communication services. Moreover, some examples of different granularity of atomic services are:
1. Transporting (with NF processing or specific NF chains) application traffic from Node set A to Node Set B.
    i. Amount may be described as a number of applications running
2. Transporting (with NF processing or specific NF chains) a PDU session traffic (of particular type) from Node set A to Node Set B.
    i. Amount may be decided by a number of protocol data unit (PDU) sessions
3. Transporting (with NF processing or specific NF chains) a traffic flow (with specific QoS/QoE) from Node set A to Node Set B.
    i. Amount may be decided by the number PDU sessions 4. Transporting (with NF processing or specific NF chains) a data packet of size X (with specific QoS/QoE) from node C to one of the nodes in a node set B).
   i. Amount may be decided by the packet size FIG. 8 illustrates, in one embodiment, a scheme 800 of using load and capacity mapping for performance assurance. The embodiment depicted shows procedures/and messages flow required to use Load2ResourceMap( ) for performance assurance. The performance assurance cases include CongestionAlarm( ) fault and any other trigger that would benefit from updating network resource allocation (e.g., scale up/down, send drone-BS) and/or operations related to policies. For example, it should be understood that in some cases, the thresholds associated with the scaling levels used by the CP functions discussed in this document could be described according to the NF or NSSI capacity boundaries corresponds to the resources used for that scaling level. These capacity boundaries are determined as the methods indicated in determining Load2ResourceMap( ) described below evaluated in terms of maximum traffic combination of atomic services that could be handled by an NF/NSSI. Similarly the predicted or current traffic load could also be evaluated according to the loading of the atomic services. These predicted or current traffic loading is compared with the respective thresholds corresponds to the current scaling level.

Figure 9:
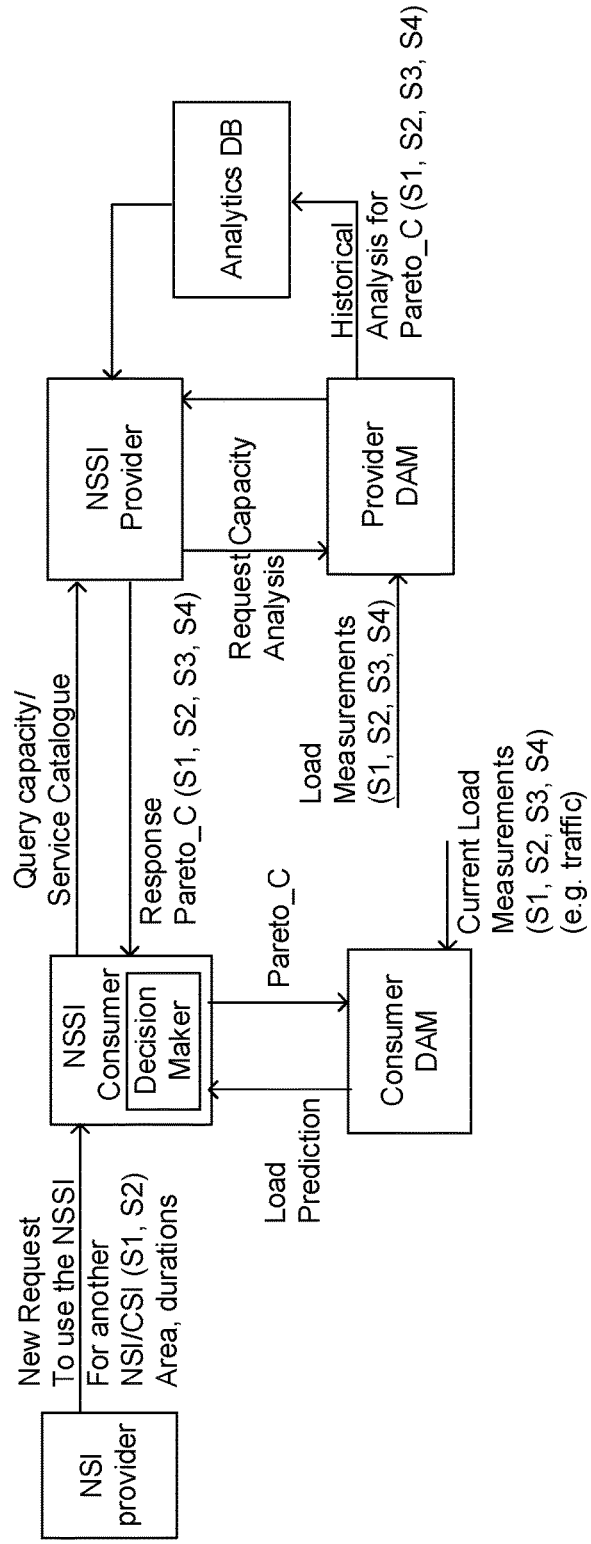
FIG. 9 illustrates, in one embodiment, a scheme 900 of using load and capacity in a case of NSSI used for multiple NSIs.

FIG. 9 illustrates, in one embodiment, a scheme 900 of using load and capacity in a case of NSSI used for multiple NSIs. This scenario may apply where an NSSI customer obtains an NSSI and uses it for different NSIs. Whenever a new NSSI is made available and a customer needs to know if the NSSI can be used for the new NSSI. Here, the provider supplies the Pareto_c based on a historical or internal analysis which involves logging the resource usage for different network loads, e.g. load2ResourceMap. The customer DAM does load prediction for the area and time zones required for the new NSI/CSI. A decision unit compares the Pareto_c and makes a decision allowing it to be used for provisioning a new NSI/CSI service.

Figure 10:
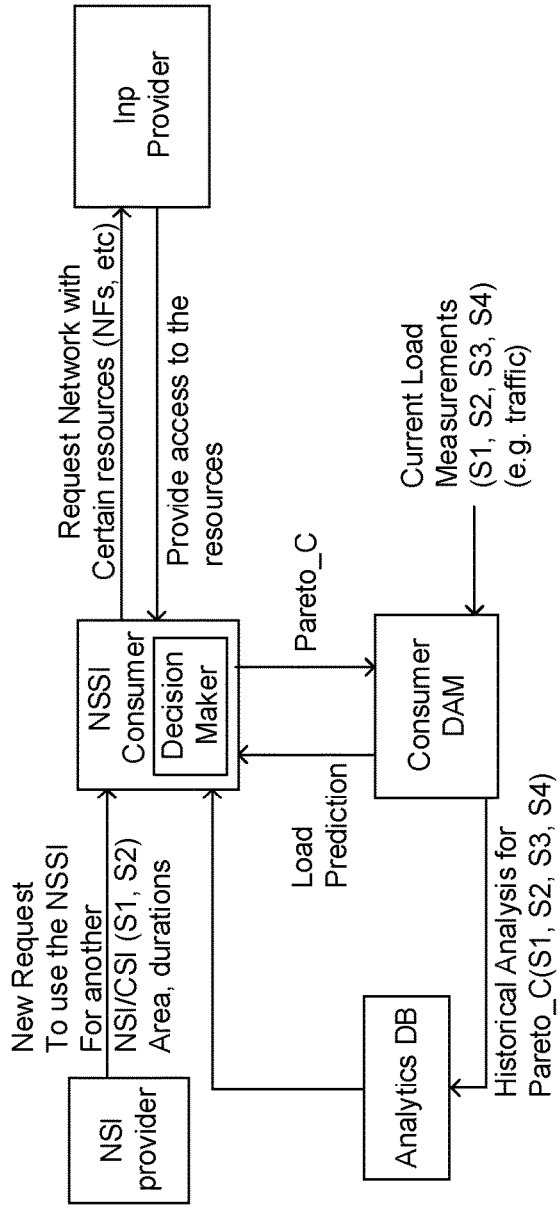
FIG. 10 illustrates, in one embodiment, a scheme 1000 of using load and capacity in a case of NSSI used for multiple NSSIs.

FIG. 10 illustrates, in one embodiment, a scheme 1000 of using load and capacity in a case of NSSI used for multiple NSSIs. In this variation, InP provides infrastructure resources and network functions, considered an NSSI based on topology. The InP develops Pareto capacity boundaries, i.e. load2ResourceMap, based on online or offline analysis using historical or internal analysis and provides services for provisioning a new NSI. The customer DAM does load prediction for the area and time zones required for the new NSI/CSI. A decision unit compares the Pareto_c and makes a decision allowing it to be used for provisioning a new NSI/CSI service.

Figure 11:
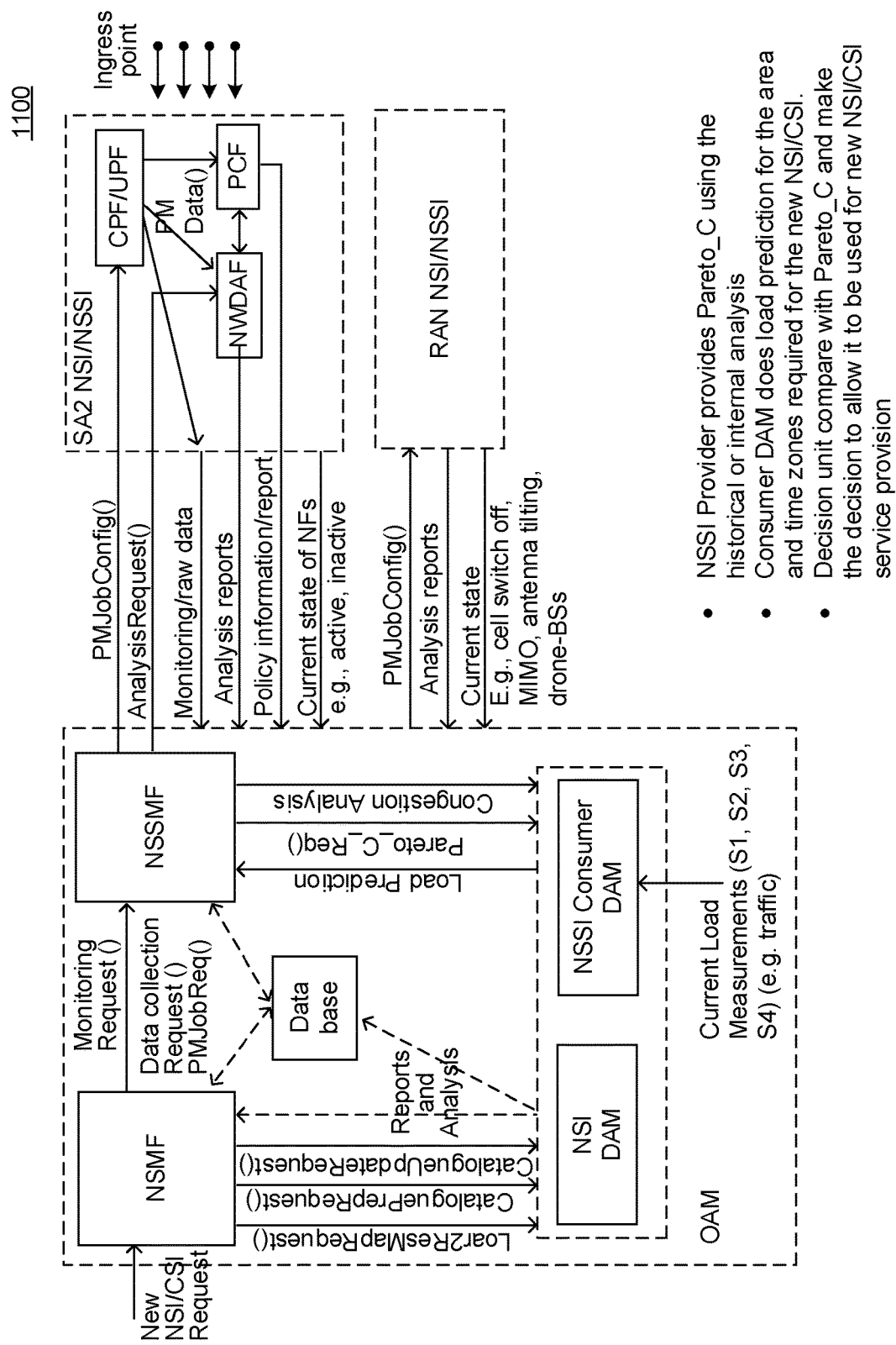
FIG. 11 illustrates, in one embodiment, an NSSI customer obtaining a sharable NSSI to create multiple NSIs.

FIG. 11 illustrates, in one embodiment, a scheme 1100 of an NSSI customer obtaining a sharable NSSI to create multiple NSIs.

Usually a slice has multiple applications or communication services. Each application has different number of active PDU sessions at a given time period. Each PDU sessions has different flows each with different QoS requirement.

Therefore, the service loading of a slice could be interpreted as the aggregation of the load of the QoS flow services, L1, L2, L3, etc.

Example: Assume that Slice A is Used for 3 Applications Run by the End Users

All the QoS types are categorized as: QoS1 to QoSm QoS parameters can be one or more of data rate, latency, packet loss rate, packet size, and Jitter. Based on the granularity a network can provide they can be categorized into different ranges of QoS.

Assuming that each application has a unique combination of different QoS types, the service loading may be measured in terms of the number of sessions of each application running in the network. However, this assumption may not be valid as depending on the usage, different PDU sessions of the same application might use different proportions of QoS flows.

Therefore, slice loading can be based on:
1. Number of QoS flows of different QoS flows.
2. Number of sessions from each application.
3. Number of users using certain application at a given time.
4. The arrival distribution (e.g rate) of sessions from each application type and their active duration distributions.
5. The number of users being served with probabilities of them being active and the probabilities of them using a given application. During a given time period.
6. Aggregate of the communication services' loads that are sharing the slice For any service or data flow the amount of traffic may be measured in different ways than that specified above. For example, volume of data as in number of bits transferred for a given service (e.g. QoS flow, packet, application as above), average or peak throughput provided to a service, the average data rates provided for each service or the peak rates provided during specific time interval are some examples.

One or more of these factors could be used to evaluate the current service loading by the network and this data made available with the core network functions.

The core network can measure the loading based on these services and provide this data to the OAM to analyze the resource usage during these periods. By learning resource usage for different loading situations the DAM can map a given service loading state to one or more resource usage state, the mapping being from one region of the service loading space to a region of resource usage space. This mapping for a given NSSI or entity is termed 'load2ResourceMap' in this document. The resource usage at a given time is also termed 'resource load' in this document.

The customer requirement for a given slice can be expressed as a service loading requirement and a matching resource could be assigned to that requirement. The geographical differences are captured by categorizing service loading in terms of the geographical areas. When the service loading changes across regions the matching resources need to be assigned dynamically, OAM does this slowly with prediction. As explained above, OAM may evaluate service loading to resource loading mapping for many situations to arrive at this prediction once a slice is put into service.

When a slice is shared among different NSSIs, the following considerations may apply:
1. If NSSI is an open NSSI, NSSI's service to resource usage mapping data would indicate the resource requirements, and resources may be requested according to the predicted service load. Increase of resources happen only if that is allowed under the SLA.
2. If the NSSI is a closed NSI, the NSI manager provide the predicted service loading to the NSSI manager and NSSI manager will assign the required resources using its DAM, Increase of resources would be done only if the corresponding service loading levels are included in the SLA.

In an NSSI service provision scenario with performance guarantee, load of each service on an NSSI may be measured. In particular, relative loading of each services can apply slice modifications, policy updates, etc., to increase efficiency of NSSI usage (e.g. resource usage).

When a NSSI service is obtained from a different network such as RAN, and if the other network individual node measurements are not accessible (e.g. NSSI is a closed network), the NSSI manager can provide the capacity expression and the current loading from which the consumer can assess whether it can accommodate more users from individuals service types or how much further it can be loaded, or do admission control or traffic filtering aspects to limit the input from certain service types according to the SLA.

When establishing SLA, for negotiation with customer, for admission control and network scaling up/down triggering, for slice modification all need this current loading information.

In one scenario where the NSSI has multiple services but used to provision a single NSI, the multiple service admission control is done using the load predictions and the capacity boundaries, using such steps as:
1. NSSI consumer (NSI provisioning service) makes the request to the NSSI provider (e.g., NSSMF)—provide service descriptions for each service, S1, S2 and S3. No network topology (e.g. node location, resource) related requirements (other than NF chains etc.). It also indicated whether it can use a shared NSSI.
2. NSSMF assess whether it is possible by knowing historical service capacity analysis and if feasible, NSSMF analyze the resource requirements. May use the service to resource mapping and find the required resources.
   i. If a non-sharable NSSI is to be used allocate resource, instantiate the NSSI and obtain capacity using previously done offline evaluations for similar resource allocation. The NSSI is provided to the consumer with the assessed capacity regions.
   ii. If a sharable NSSi is allowed, NSSMF checks the feasibility to use an existing NSSI and assess the resource modifications needed.
3. The consumer takes the NSSI and use the capacity boundaries to select the appropriate capacity boundary for the current service demand.
4. Depending on the predicted demand of each service type, obtained from the Data analytics unit, the consumer will select the capacity boundary to be used. Different services will have different revenue earnings and these need to be taken into consideration when this decision is made.
5. Based on the capacity boundary for each service, the consumer may do load balancing to transfer traffic to other NSSIs and vice versa, ingress traffic control (e.g. filtering/priority), admission control at the source, policy changes for traffic handling, etc.

Figure 12:
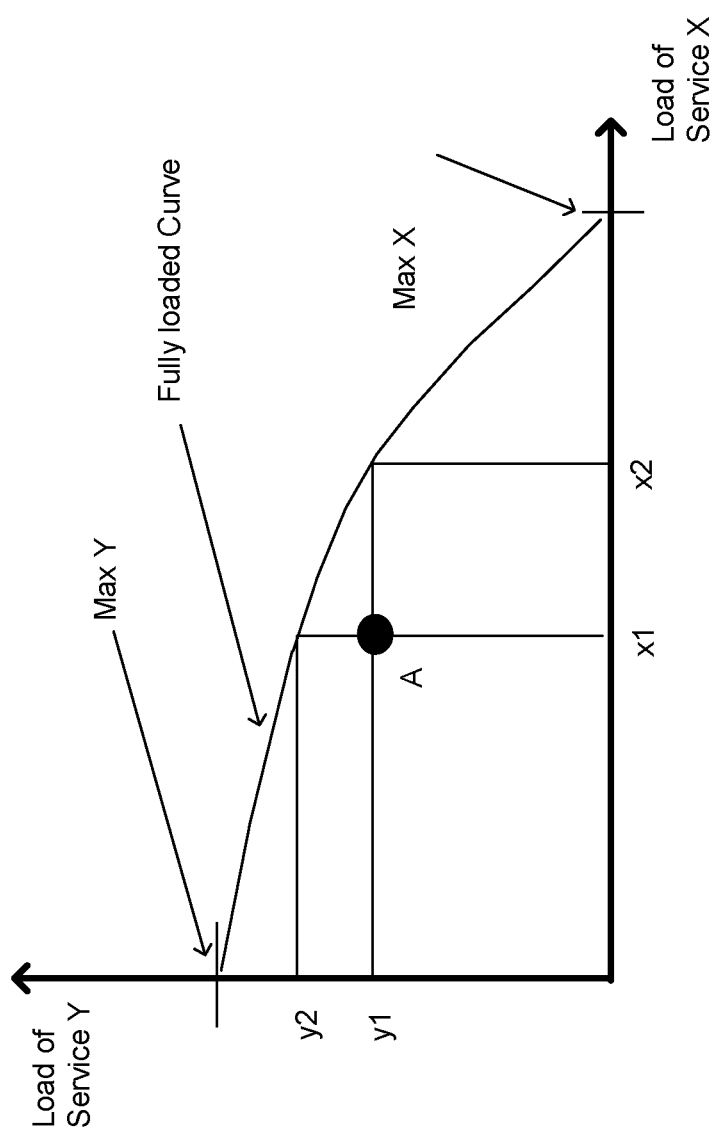
FIG. 12 illustrates, in one embodiment, a loading case for an isolated NSSI.
Figure 13:
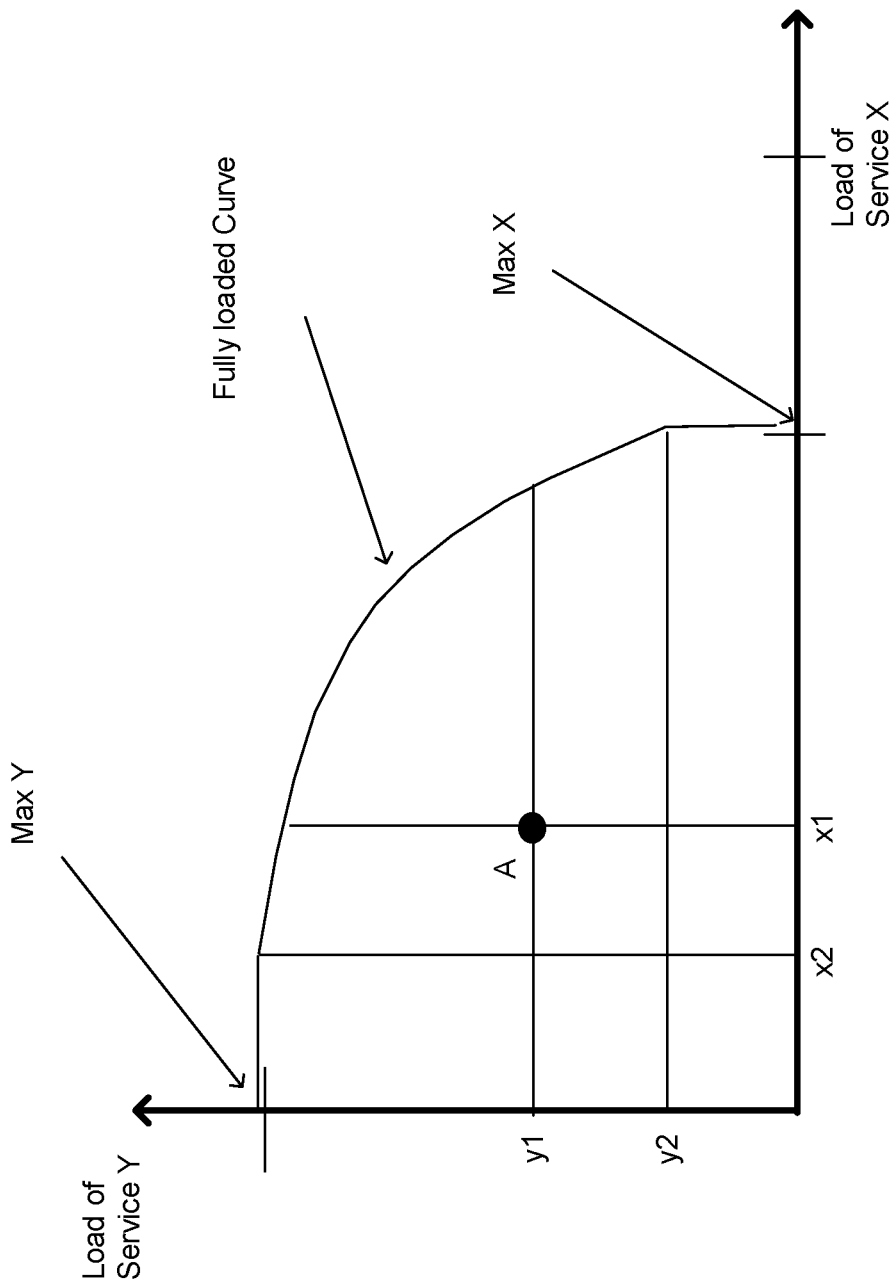
FIG. 13 illustrates, in one embodiment, a loading graph for an isolated NSSI having two service types.

FIG. 12 illustrates, in one embodiment, a loading case for an isolated NSSI, where an NSSI is used by only a single NSI, for two service types. A single NSSI can provide multiple services. FIG. 12 in conjunction with FIG. 13 illustrate the case where two services are provided by the NSSI and both services share the same resources when the resource usage may be not equal, for example, video and VOIP data passing through a wired link.

In general, resource usage may not be linear at different loading, which might happen, for example, due to the resource multiplexing gain.

In a first definition of fully loaded, if for all service types no more services can be added (e.g. none of the input points can take more traffic), that NSSI is a fully loaded (full capacity) NSI (100% loaded). There can be multiple capacity points as per this definition depending on the combination of loading of different services. For instance, points (Max_X, 0), (0, Max_Y), (x1, y2), (x2,y1) in FIG. 12 indicate a fully loaded NSSI which defines a curve with two service types. In this case, only a single curve exists as the full load curve.

However, with more than two services the full load function will be a surface. There can be multiple of these services providing the fully loaded state, i.e. Pareto boundaries. One surface may be represented as $f(L_1, L_2, \ldots, L_i, \ldots, L_N)=1$; $f_{f1}(L1, L2, \ldots Ln)=1$.

In certain cases, up to a certain load level a particular service (X) may not impact the other services (Y) at all as illustrated in FIG. 12, i.e. when x<X2 load of x does not impact the Y's capacity and when y<Y2, load of y does not impact the X's capacity. This may happen, for example, when a certain resource (R1) located in a specific location could only be used by service X, and cannot be used by the service Y. However, after the resource R1 is fully utilized (i.e. Load x=X1), load X can be further increased by utilizing common resources. So in this case, which is a more generic case, there are service specific capacity regions and we can define service specific capacity.

With regard to FIG. 13 again, a case of a second definition of fully loaded service capacity for a specific service, If no users/sessions can be added for one of the services provided by the NSSI, the NSSI is full for that service types, while it might not be fully loaded for the other service types.

Note that in FIG. 12, x<x2 points are not fully loaded points according to the first definition above, since still more services of type X can be added, although NSSI is full from the point of view of service Y.

Figure 14:
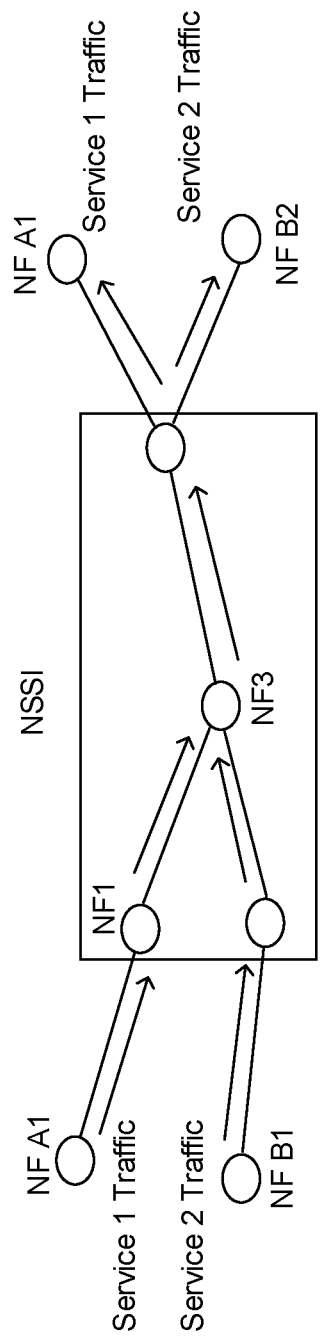
FIG. 14 illustrates, in one embodiment, a practical example of an apparent fully loaded condition for an isolated NSSI.

FIG. 14 shows, in one embodiment, a practical example where the latter fully loaded may happen. Some resources of the NSSI shown are shared by 2 different services, e.g., NF3, whereas some others can be used by a single service, e.g., NF A1 and NF B2. If a resource associated with NF1 is full, it would impact service 1 but not service 2. However, if a resource associated with NF3 is full, it will impact both services.

Now with regard to partial loading, once a partial loading is known, the consumer could decide how much more services could be added or how much load could be increased for the NSSI. In this way the NSSI owner does not have to expose all the details of the internal network for consumer to use it efficiently (e.g. by controlling traffic by admission control, traffic filtering, etc.), i.e. partial loading can be used as an abstracted view of the current loading. It can also be used for providing feedback of the current network usage to the customer.

In regard to FIG. 13, at point A neither of the services are fully loaded. The loading at this point could be defined in several ways as indicated below. In general, NSSI overall loading is a function of loading of each service, or $f(L_1, L_2, \ldots, L_i, \ldots, L_N)$, where $L_i$ indicates the load of the $i^{th}$ service and N and is the total number of services utilizing NSSI resources.

Two types of loading metrics may be defined as follows:
(1) Service specific NSSI loading: To give an idea of how the NSSI is loaded specific to a given service. This should indicate how much the loading of a given service can be increased if other service loading is not changed. So it can be defined as the ratio of the current loading of a service to the maximum loading it can handle if other service loading is not changed (i.e.

current loading of service X/Service specific capacity of service X for the current service loading values of other services)→NSS_Lx=Lx/Cx(Ly, Lz)

The service specific loading index can be found at a specified loading of the other services are known by the following equation, when the capacity function is known. Find Max_L1 value which makes the system fully loaded by fixing the loading of the other service loading.

L(L1)=f_f1(max_L1, L2, . . . Ln)/

(2) Overall NSSI Loading: To give an idea of how the NSSI is loaded overall considering all the services. Since different services have different levels of loading at a given time, the overall loading will be a combined function of individual loading. Depending on how individual services impact the capacity the combined function could use different weighting for individual services.

Overall NSSI loading=f(NSS_Lx, NSS_Ly, NSS_Lz), e.g.

e.g., $L\_NSSI(x1,y1,z1)=(NSS\_Lx*Max\_X+ NSS\_Ly*Max\_Y+NSS\_Lz*Max\_Z)/Max\_X+ Max\_y+Max\_z)$

For example, according to the generic case in FIG. 3-2, the following loading matrices can be found according to above definitions.

If x<x2 and y=Max_Y, NSS_Lx=x/x2; NSS_Ly=1;

Overall NSSI $L=(x/x2*Max\_X+1*Max\_Y)/(MAX\_X+Max\_Y)$;

If x, x2 and y<y2, NSS_Lx=x/Max_X; NSS_Ly=y/Max_Y;

Overall NSSI $L=(x+y)/(Max\_X+Max\_Y)$;

NSSI loading definition Examples:

Assume the highest load of services X, Y can handle are Max_X and Max_Y respectively.

Case 1: Assume loading relationship is similar to the one shown in FIG. 3.1 (resource sharing) and the full capacity curve is linear. In that case, load as a single number can be represented by, the proportion of traffic in each input:

$L \rightarrow (x1/Max\_X+y1/Max\_Y)$.

For example, if L>1 the system cannot handle that traffic load. If L=0.5, either of the service can increase the load until the load index becomes one. For example, if y1 is kept without changing, x1 can increase to X1, where X1 can be found by solving the following equation:

$X1/Max\_X+y1/Max\_Y=1; \rightarrow X1=Max\_X(1-y1/Max\_Y)$

Case 2: Assume loading relationship is similar to one in FIG. 3.2 (not all the resources are shred), and that the when resources are shared the usage is proportional to the loading (i.e. the middle curve in the diagram is linear). In this case, loading relationship is different for different regions.

If x1<x2, and y1<y2→L→x1/x2+y1/y2+Max_x-x2/Max_X+M

If x1>x2 and y1>y2→L→(x1/(Max_X-x2)+y1/(Max_Y-y2).

(x1+y1)/(Max_X+Max_Y), if both services can use all the resources. But one service may utilize more resources (for example, service X use more resources). traffic can go either way or if traffic from both A and B are equally important Load as % traffic in each input: (x1/Max_X, y1/Max_Y). For example, loading matrix=[x1/20, y1/30]

Another single number: [x1/20+y1/30]/2. When customer has the SLA separately for each input (may be traffic from two different geographical areas)

Other relative measures:

(x1/x2, y1) or (x1, Y1/y2) or (x1/x2, Y1,y2)

Since a single NF could be considered as another NSSI within NSSI above loading description applies to a single NF of a NSSI and the above loading may be described as the loading of the bottleneck NF of the NSSI for some applications.

Figure 15:
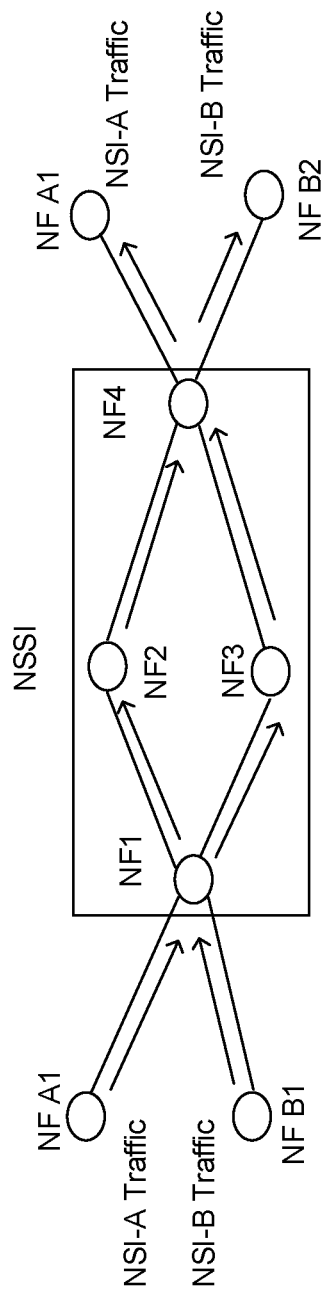
FIG. 15 illustrates, in one embodiment, a scheme for an NSSI providing only a single service, shared by multiple NSIs.

FIG. 15 illustrates, in one embodiment, a scheme for an NSSI providing only a single service, shared by multiple NSIs. A shared NSSI provides services to multiple NSIs. Assuming there are 2 NSIs sharing the NSSI, following scenarios are possible.

1. Both NSIs need the same service (See FIG. 3-4)
2. One NSI needs service 1, other NSI needs service 2. The load definitions and their usage are similar to case described in FIG. 3-3. The impact is on how the capacity information is provided to two NSIs if they share the resources.
3. Two NSIs require different portions of capacity of service 1 and service 2.

Figure 16:
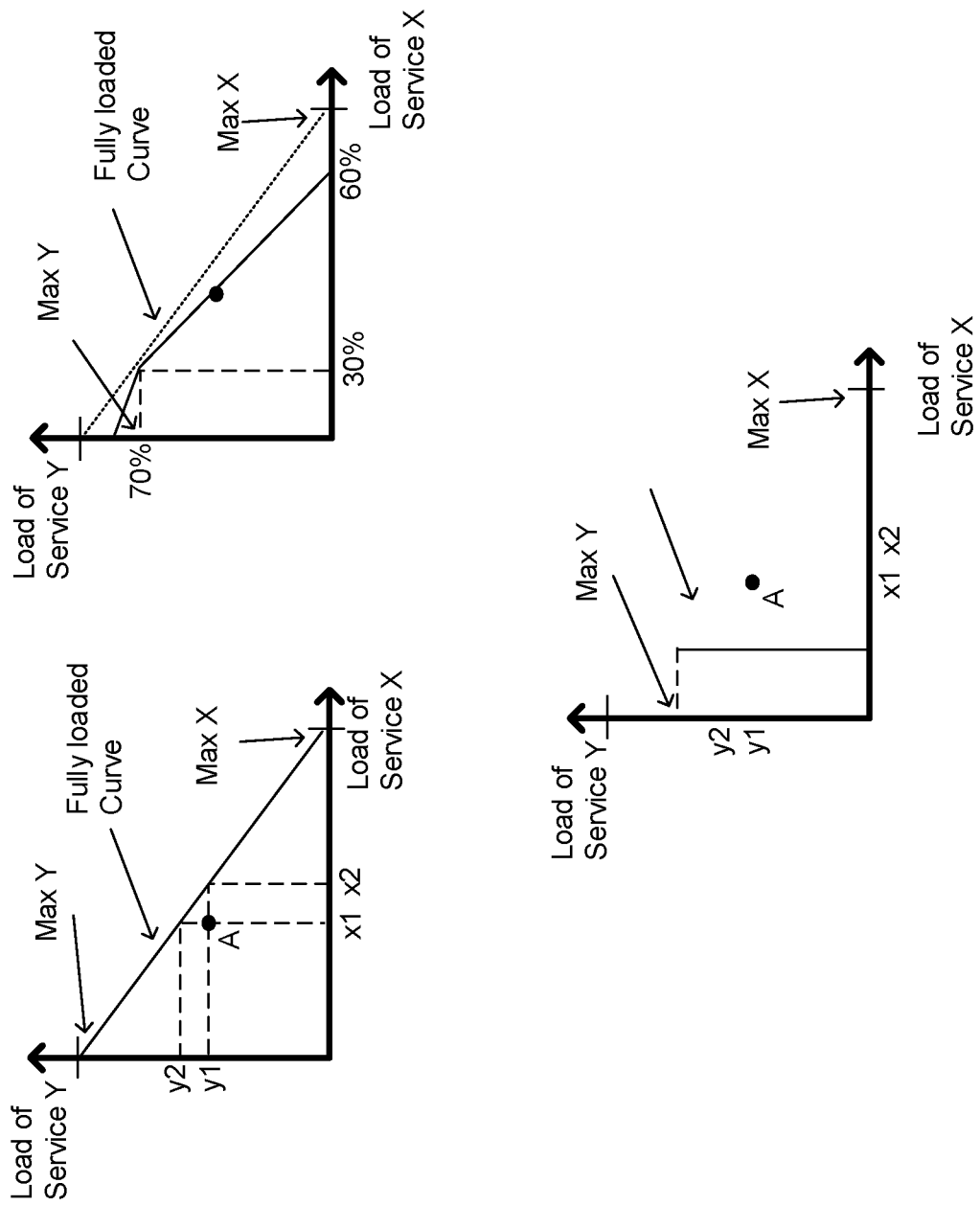
FIG. 16 illustrates, in example embodiments, various soft slicing and hard slicing scenarios, for NSIs sharing resources of the NSSI.

FIG. 16 illustrates, in example embodiments, various soft slicing and hard slicing scenarios, for NSIs sharing resources of the NSSI. the NSSI provides a single service shared by multiple NSIs as shown in FIG. 15. Although similar to the case in FIG. 15, the resources of the NSSI are shared by different slices, instead of different services. There are 3 sub-scenarios related to this case:

1. soft-slicing without minimum performance guarantee
2. Soft-slicing with minimum performance guarantee
3. Hard slicing Assume two NSIs (or services) share the resources of the NSSI as shown in FIG. 16. The left-most subfigure shows soft slicing of resources, without pre-allocation of node or link resources to each slice/service (total resources are limited). The middle figure shows soft slicing with a minimum guarantee of resources. For example, service X obtains at least Min_X=30% of resources and service Y obtains at least Min_Y=40%. Finally, the right-most subfigure shows hard-slicing, where a fixed amount of resources are assigned to each slice/service.

Figure 17:
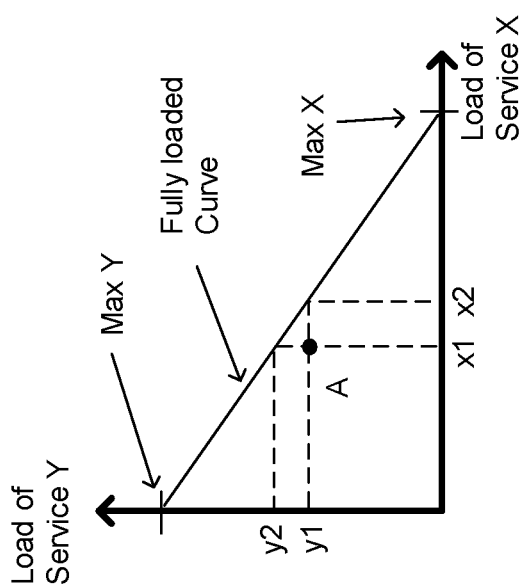
FIG. 17 illustrates, in one embodiment, a case of soft slicing with a capacity guarantee.

FIG. 17 illustrates, in one embodiment, a case of soft slicing with a capacity guarantee. In this case, limited resources of NSSI are dynamically allocated to services/slices based on their demand. This scheme can allow efficient utilization of resources, since it is dynamic. However, methods to maintain QoS in cases of congestion are required. These methods include prediction to estimate spatiotemporal need from each slice/service. In short, following issues need to be solved by a soft slicing model:

1. Excess packet treatment: When the NSSI is getting congested, the algorithm/criterion/policy to drop/mark packets may be needed. Based on the model shown in FIG. 21, this algorithm can be applied at the ingress to NSSI or at intermediate nodes of the NSSI if packet drops need to be done in a fair manner or biased to one slice. This needs SA2 considerations.

2. New session blocking: When the slice is fully loaded, new sessions need to be blocked with a certain policy. This may be governed by the management decision (NSSMF MDAS, i.e., NSSI DAM). When a new session starts and if the new session is to user that NSSI, the SAC (session admission control) function needs to check whether the capabilities of the NSSIs can handle the new session.

In an embodiment of soft slicing with capacity guarantee, each slice has a minimum guarantee of (resource service capability/capacity). However, when one slice is not using its minimum quota, other slices should be able to use it, if they have extra traffic. Success of this method can be increased by predictive methods.

If there are more than two slices, the excess capacity may be shared among other slices in a fair manner or according to a pre-agreed priority mechanism with each NSI. SLA agreement may indicate that based on the algorithm options that can be used. This mapping and how these agreements might work need to be evaluated.

When Slice/service X resources are not utilized, not all unused resources can be used by other slices because, whenever a new session arrives for slice X that need to be accommodated as slice X had not utilized its resources. This means the need of slice X for a future time, needs to be predicted/estimated and some resources need to be kept for that (there is always a gap between soft guaranteed case (Case A) and this minimum guaranteed case as shown in FIG. 35). This gap (unused resources could be decreased if the variation of the input traffic for slice X is low, or there is a larger provision for outage in SLA of slice A (less penalties compared to gain in resource usage), or the packets, sessions from other slices using excess resources can be pre-empted (disconnected or blocked, made best effort traffic, etc.

In a hard slicing embodiment, by contrast strict service capacity/resource allocation (or hard slicing) is established. In other words, there is no dynamic adjustment of resources, and each slice/service is given a constant amount of resources regardless of whether they are currently used by the slice/service or not. Since there is tight service capacities for each NSI, there is less complexity. Each slice traffic will be controlled by the admission policies of each slice/service session.

However, due to variation of resource requirement in each slice, still there is no strict guarantee on QoS, as per the following 2 cases:
1. Especially when a NSSI has a wireless links, capacity is probabilistic, regardless of the amount of resources associated with the slice/service
2. When the input traffic varies rapidly which makes the system overloads certain times, it is not possible to avoid congestion with static resource allocation.

Another variation, including 2 scenarios, enables load measurement of each service on an NSSI when NSSI is shared by multiple NSI/central NSSI. The NSIs use the same service, and share resources of the NSSI via hard or soft slicing. In particular, relative loading of each services is utilized modifications, policy updates etc. can be done to increase efficiency of NSSI usage.
1. Scenario 1: NSSI is shared between two NSIs (already established as in Scenario 2). They are using the same service with soft slicing of resources. In that case, the NSSMF has to inform capacity boundaries for each NSI separately and dynamically adjust them depending on loading information from each of the NSI. In this case, loading and or loading predictions from different NSI's need to be obtained by the NSSI DAM and provide the optimal solution which maximizes an objective function.
2. Scenario 2: Providing a sharable NSSI to a different NSI. Same as the scenario in Embodiment 1. However, in this case, the modification of the current NSSi to add new resources during provisioning need to be considered and new Pareto_C creation and providing those to both NSIs in run time as in Scenario 1.

Figure 18:
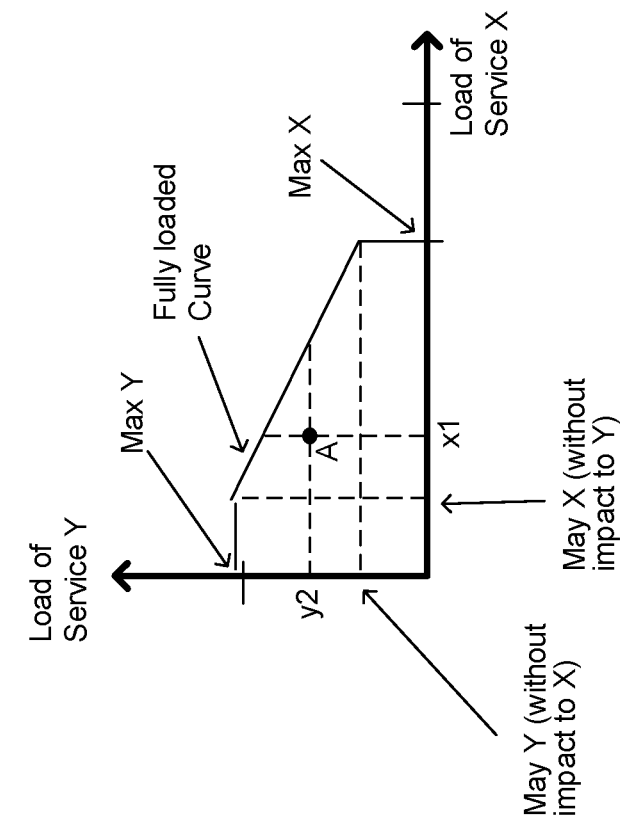
FIG. 18 illustrates, in one embodiment, an NSSI providing multiple services shared by multiple NSIs, but with the services being of different service types.

FIG. 18 illustrates, in one embodiment, an NSSI providing multiple services shared by multiple NSIs, but with the services being of different service types.

Each service is shared between two NSIs at different proportions. Therefore, from the point of view of an NSI, the percentage of loading needs to be defined based on multiple criteria.

Capacity that can be provided to each NSI from each service may be found using, for example, a composition of functions: $fog(L_1, L_2, \ldots, L_i, \ldots, L_N)$, where $g(L_1, L_2, \ldots, L_i, L_N)$ is the function of NSSI load due to each slice for using service i. Note that f is the effect of load of each service on NSSI.

Figure 19:
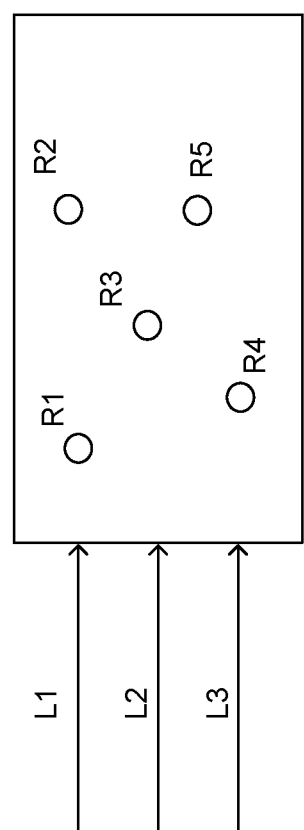
FIG. 19 illustrates, in one embodiment, using load and capacity mapping for allocating an NSSI.

FIG. 19 illustrates, in one embodiment, using load and capacity mapping for allocating an NSSI. Loading relation to resource usage. How much capacity is left of a given system (i.e. how much more services can be provided) may be determined in two ways:
1. By Knowing the full capacity of the system and the current loading OR
2. By knowing the resource usage at full capacity and the current resource usage.

For example, let L1, L2, L3 be the loading of the 3 types of services provided by the NSSI, and R1, R2, R3, R4 and R5 indicate the resource usage for all the resources used at the specified loading, as shown in FIG. 19.

By loading the system with all the combinations of L1, L2, and L3, we can obtain load to resource usage mapping. Note that one input loading combination may map to multiple resource usage metrics and vice versa. Therefore, a database may be developed with all these combinations. These data bases can be offline or historical. Quantization is required to reduce the number of data points.
1. When a system is fully loaded (i.e., maximum amount of services are provided), by analyzing resource usage the network operator can identify redundant resources and remove them or use it for a different purpose.
2. Analyzing how different $L_i$ increasing trends impact on R[n]. When resource impact by further increase of $L_i$ could be assessed, this is helpful in admitting a new user at a future time.

To define full loading, as service A and service B might have multiple points of full loading as shown in FIG. 19, assume, [X1, Y1] and [X2, Y2] are two full load points. These can be mapped to two different optimal resource usage scenarios [R11, R21], [R21, R22], etc.

Figure 20:
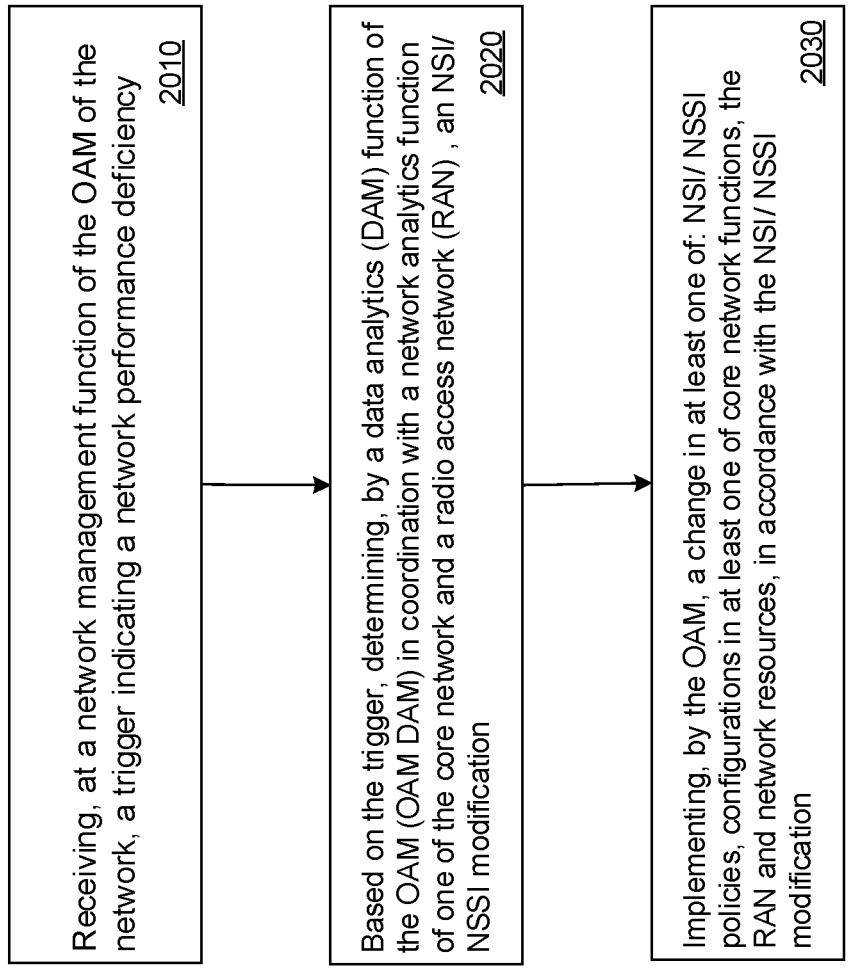
FIG. 20 illustrates, in one embodiment, a method used for performance assurance for performance assurance with conflict management in provisioning a network slice service.

FIG. 20 illustrates, in one embodiment, a method 2000 for performance assurance with conflict management in provisioning a network slice service.

The method, at step 2010, includes receiving, at a network management function of the OAM of the network, a trigger indicating a network performance deficiency. The deficiency may relate to or include a network resource inadequacy, low resource utilization, or low slice traffic demand of an NSI or NSSI, for example.

The method, at step 2020, further includes based on the trigger, determining, by a data analytics (DAM) function of the OAM (OAM DAM) in coordination with a network analytics function of one of the core network and a radio access network (RAN), an NSI/NSSI modification. For this step, the AM may coordinate with the core network (e.g, via a communication to obtain certain information of traffic, slice performance).

The method, at step 2030, further includes implementing, by the OAM, a change in at least one of: NSI/NSSI policies, configurations in at least one of core network functions, the RAN and network resources, in accordance with the NSI/NSSI modification.

For further clarity, it is noted that, according to embodiments, the NWDAF provides data and analysis. However, the NWDAF does not necessarily direct or perform the NSI or NSSI modification. Rather, NSI/NSSI modification may be performed by the OAM. The OAM may utilize data and analysis of NWDAF to determine the required modifications.

Figure 21:
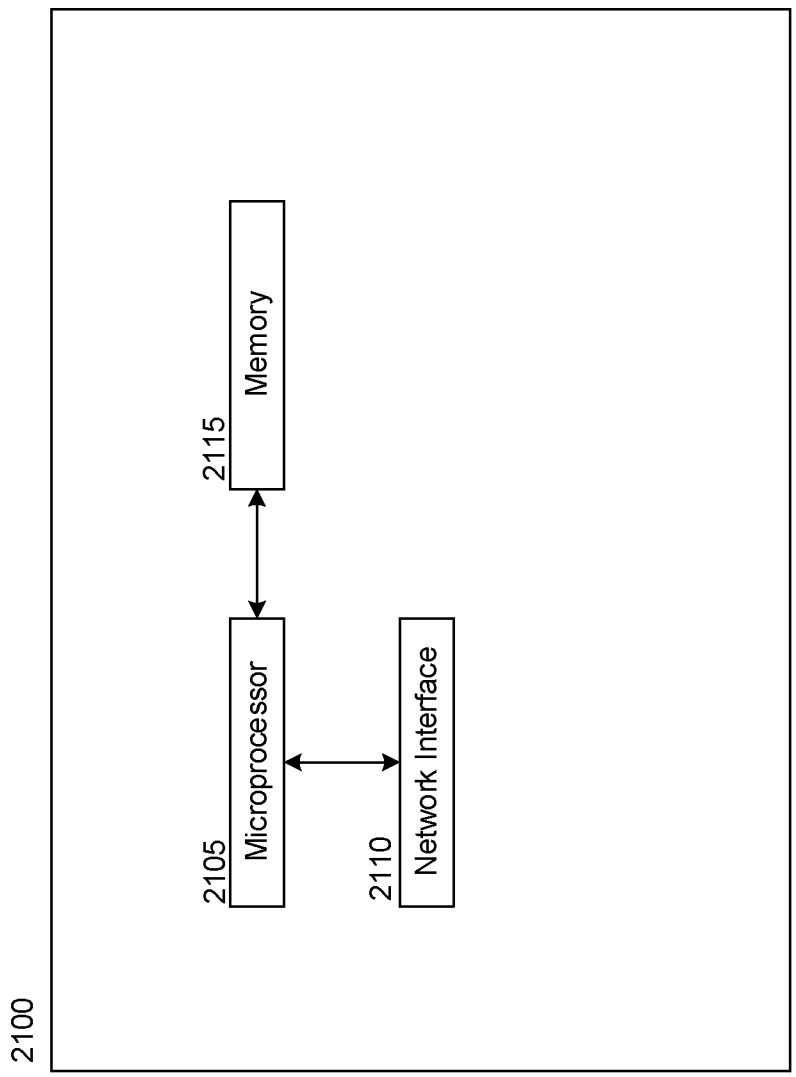
FIG. 21 illustrates, in one embodiment, aspects of a computing device used for performance assurance with conflict management in provisioning a network slice service.

FIG. 21 illustrates, in one embodiment, aspects of a computing device 2100, used for performance assurance with conflict management in provisioning a network slice service. The operations described in regard to FIG. 20 may be performed by one or more functional modules of a computing device, which may be one or more server computing devices, which include at least a microprocessor 2105, network communication interface 2110 and memory 2115, operating in concert to perform any of the above-described operations. Memory 2115 may include instructions executable in processor 2105 for performing operations as described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for performance assurance in a network slice subset instance (NSSI) or a network slice instance (NSI) of a network, the method comprising:
receiving, at a network management function (OAM) of the network, a trigger indicating a network performance deficiency which persists despite a first corrective action previously taken using one or more control plane functions belonging to one or both of a core network portion of the network and a radio access network (RAN) portion of the network;
based on the trigger, determining, by a data analytics (DAM) function of the OAM (OAM DAM) in coordination with a network analytics function of one of the core network portion of the network and the RAN portion of the network, an NSI/NSSI modification; and
implementing, by the OAM, a change in at least one of: NSI/NSSI policies, configurations in at least one core network function, the RAN portion of the network, and network resources, in accordance with the NSI/NSSI modification,
wherein, following said implementing the change, said one or more control plane functions are configured to perform further corrective action, wherein said further corrective action is taken in accordance with the change in the at least one of: the NSI/NSSI policies, and the configurations as implemented by the OAM.

2. The method of claim 1, further comprising prior to the receiving the trigger, receiving a request for a network slice (NSI/NSSI) service and configuring one or more of the core network functions and RAN management functions in at least one of: the NSI/NSSI policies, the configurations in core network functions, and the network resources, in accordance with the network slice service request, wherein the core network functions and the RAN management functions are configured to perform the first corrective action in accordance with the configurations.

3. The method of claim 1, wherein the implementing by the OAM in coordination with the NWDAF further comprises requesting, by the OAM, one of scaling up and scaling down of NSSI resources based on a resource load level of the NSSI.

4. The method of claim 1, wherein the implementing by the OAM in coordination with the NWDAF further comprises sending, by the OAM, a service capacity of the network, wherein the service capacity is specified in accordance with an amount of traffic of each service of multiple combinations of the supported services as provided by the network.

5. The method of claim 1, wherein the trigger indicating the network performance deficiency is responsive to at least one of: a detected network performance deficiency, an anticipated network performance deficiency, a low resource utilization and a low slice traffic demand compared to service level agreement (SLA) requirements as monitored over a period of time or as predicted for a future time, and a violation of a service level agreement (SLA) administered by a NSSI management function (NSSMF) on behalf of the NSSI.

6. The method of claim 2, wherein the configuring one or more of the core network functions and RAN management functions in at least one of: NSI/NSSI policies, configurations in core network functions, and network resources, in accordance with the network slice service request is enabled by at least one of a traffic control policy, a session admission control policy, and a quality of service (QoS) policy for traffic using the NSI/NSSI.

7. The method of claim 6, wherein the traffic control policy includes at least one of network resource load balancing, source traffic blocking, source traffic smoothing, traffic filtering for a set of ingress traffic, and modifying a service prioritization in at least one network region or network function.

8. The method of claim 2, wherein the first corrective action includes blocking ingress traffic when it exceeds the service capacity parameter provided in the configurations for a network segment handling traffic for a geographical area wherein the service capacity is one or more of:
- a number of traffic flows with a specific QoS going through a specific network function chain, passing through specific ingress location of the network segment to a specific egress point in the network segment;
- a number of sessions from each application;
- a number of users using certain application at a given time;
- an arrival distribution characteristic of sessions from each application type and their active duration distributions; and
- a number of users being served with probabilities of them being active and the probabilities of them using a given application during a given time period.

9. The method of claim 5, wherein the network resource inadequacy, the low resource utilization, or both, are based on the network resource utilization of the service reaching a specified threshold level.

10. The method of claim 5, wherein the NSSI management function (NSSMF) is configured to expose a NSSI capacity expression and a current loading level to a NSSI customer to determine at least one capacity boundary for load balancing associated with traffic transferred to or from other NSSIs of the network and a change of a traffic control policy.

11. The method of claim 1 further comprising, responsive to the change in the at least one of: NSI/NSSI policies, configurations in core network functions, and network resources, sending one of a service level agreement (SLA) or key performance indicators (KPIs) thereof, and a modification to a pre-existing SLA or KPIs thereof to a NSSI management function.

12. The method of claim 1, wherein the change in the at least one of: NSI/NSSI policies, configurations in core network functions, and network resources comprises at least one of a traffic control change, a session admission control change, a redirection of ingress network traffic of the NSSI to at least another NSSI of the network, and relaxation of a quality of service (QoS) of traffic using the NSSI.

13. The method of claim 1, wherein the network comprises a plurality of NSIs, and further comprising sharing the NSSI among the plurality of NSI's, each of the plurality having a respective service level agreement (SLA) in accordance with the sharing.

14. The method of claim 1, wherein implementing the change in accordance with the NSI/NSSI modification comprises deactivating one or more active NSSIs or one or more network functions, or activating one or more inactive NSSIs or one or more inactive network functions.

15. The method of claim 1, wherein said determining the NSI/NSSI modification is performed based at least in part on an indication of a load to resource mapping which is generated based on historical data.

16. A system supporting a network slice subset instance (NSSI) or a network slice instance (NSI) in a communication network, the system comprising:
- a communication interface;
- a processor; and
- a memory device storing instructions that, when executed by one or more processors, cause the system to:
  - receive a trigger indicating a network performance deficiency which persists despite a first corrective action previously taken using one or more control plane functions belonging to one or both of a core network portion of the network and a radio access network (RAN) portion of the network;
  - based on the trigger, determine an NSI/NSSI modification; and
  - implement a change in at least one of: NSI/NSSI policies, configurations in at least one core network function, the RAN portion of the network, and network resources, in accordance with the NSI/NSSI modification,
  - wherein, following said implementing the change, said one or more control plane functions are configured to perform further corrective action, wherein said further corrective action is taken in accordance with the change in the at least one of: the NSI/NSSI policies, and the configurations as implemented by a network management function (OAM).

17. The system of claim 16, wherein the instructions that, when executed by one or more processors, further cause the system to: prior to receiving the trigger, receive a request for a network slice (NSI/NSSI) service and configure one or more of the core network functions and RAN management functions in at least one of: the NSI/NSSI policies, the configurations in core network functions, and the network resources, in accordance with the network slice service request, wherein the core network functions and the RAN management functions are configured to perform the first corrective action in accordance with the configurations.

18. The system of claim 16, wherein the trigger indicating the network performance deficiency is responsive to at least one of: a detected network performance deficiency, an anticipated network performance deficiency, a low resource utilization and a low slice traffic demand compared to service level agreement (SLA) requirements as monitored over a period of time or as predicted for a future time, and a violation of a service level agreement (SLA) administered by a NSSI management function (NSSMF) on behalf of the NSSI.

19. The system of claim 16, wherein the instructions that, when executed by one or more processors, further cause the system to: responsive to the change in the at least one of: NSI/NSSI policies, configurations in core network functions, and network resources, send one of a service level agreement (SLA) or key performance indicators (KPIs) thereof, and a modification to a pre-existing SLA or KPIs thereof to a NSSI management function.

20. The system of claim 16, wherein the instructions that, when executed by one or more processors, further cause the system to perform one or both of: coordinating with a network analytics function of one of the core network and a radio access network (RAN) to determine the NSI/NSSI modification; and requesting one of scaling up and scaling down of NSSI resources based on a resource load level of the NSSI that alleviates the network performance deficiency.

* * * * *

UNITED STATES PATENT AND TRADEMARK OFFICE
CERTIFICATE OF CORRECTION

PATENT NO. : 11,026,106 B2
APPLICATION NO. : 16/670962
DATED : June 1, 2021
INVENTOR(S) : Remziye Irem Bor-Yaliniz et al.

It is certified that error appears in the above-identified patent and that said Letters Patent is hereby corrected as shown below:

In the Specification

In the Description

Column 27, Line 29, "FIG. 35). This gap (unused resources could be decreased if" should be --Fig. 18). This gap (unused resources could be decreased if--

Signed and Sealed this
Nineteenth Day of July, 2022

Katherine Kelly Vidal
*Director of the United States Patent and Trademark Office*